US011999330B2

(12) United States Patent
Dando et al.

(10) Patent No.: US 11,999,330 B2
(45) Date of Patent: Jun. 4, 2024

(54) LOCKING DEVICE

(71) Applicant: Bear Trap Security Ltd., Castle Cary (GB)

(72) Inventors: Christopher Dando, Bath (GB); Matthew Dando, Bath (GB)

(73) Assignee: Bear Trap Security Ltd. (GB)

( * ) Notice: Subject to any disclaimer, the term of this patent is extended or adjusted under 35 U.S.C. 154(b) by 614 days.

(21) Appl. No.: 16/933,981

(22) Filed: Jul. 20, 2020

(65) Prior Publication Data

US 2021/0024042 A1    Jan. 28, 2021

(30) Foreign Application Priority Data

Jul. 22, 2019  (GB) ...................................... 1910474
Dec. 20, 2019  (GB) ...................................... 1919106

(51) Int. Cl.
*B60T 3/00* (2006.01)
*B60B 7/16* (2006.01)
(Continued)

(52) U.S. Cl.
CPC .................. *B60T 3/00* (2013.01); *B60B 7/16* (2013.01); *B60T 1/005* (2013.01); *B62B 5/0495* (2013.01);
(Continued)

(58) Field of Classification Search
CPC ......... B62B 5/049; B62B 5/0495; B60T 3/00; B60B 7/16; E05B 73/00
See application file for complete search history.

(56) References Cited

U.S. PATENT DOCUMENTS 1,658,969 A * 2/1928 Close ....................... F23K 3/00
                                                        110/109
3,918,278 A    11/1975 Spear
(Continued)

FOREIGN PATENT DOCUMENTS

CA        2381310 A1 * 10/2003  ........... B60R 25/093
CN      205837016 U    12/2016
(Continued)

OTHER PUBLICATIONS

Application No. GB1910474.4, Search Report under Section 17(5) dated Dec. 31, 2019.
(Continued)

*Primary Examiner* — Melanie Torres Williams
(74) *Attorney, Agent, or Firm* — Thomas | Horstemeyer, LLP

(57) ABSTRACT

A locking device, for securing a toolbox with respect to a support structure, comprising a housing for receiving at least part of a ground engagement mechanism of a toolbox. The housing is configurable to have an opening, or has an opening, through which at least part of a ground engagement mechanism of a toolbox may be inserted into and removed from the housing. The locking device comprises a retaining mechanism that is movable between a retaining configuration, that prevents the removal of the at least part of the ground engagement mechanism from the housing through the opening, and a releasing configuration that allows the removal. The retaining mechanism comprises a retaining member that is movable between a first position such that the retaining mechanism is in the retaining configuration and a second position such that the retaining mechanism is movable to, or is in, the releasing configuration. The locking device comprises a lock configured such that the retaining member is selectively lockable in its first position and the locking device comprises a retaining member protector (Continued)

configured to substantially prevent access to at least part of the retaining member through the opening, when the retaining member is in the first position.

15 Claims, 21 Drawing Sheets

(51) Int. Cl.
*B60T 1/00* (2006.01)
*B62B 5/04* (2006.01)
*E05B 73/00* (2006.01)
*B25H 3/00* (2006.01)
*B60B 33/00* (2006.01)

(52) U.S. Cl.
CPC ............... *E05B 73/00* (2013.01); *B25H 3/00* (2013.01); *B60B 33/00* (2013.01)

(56) References Cited

U.S. PATENT DOCUMENTS

| | | | |
|---|---|---|---|
| 5,479,794 A | | 1/1996 | Rains |
| 6,116,062 A | * | 9/2000 | Markegard ............ B60R 25/093 70/237 |
| 2006/0081025 A1 | | 4/2006 | Smith et al. |
| 2018/0222515 A1 | * | 8/2018 | Kawade .................... B60T 1/04 |

FOREIGN PATENT DOCUMENTS

| | | |
|---|---|---|
| CN | 206437104 U | 8/2017 |
| FR | 2605668 A1 | 4/1988 |
| FR | 2694260 A1 | 2/1994 |
| GB | 2538740 A | 11/2016 |
| GB | 6034133 S | 4/2018 |

OTHER PUBLICATIONS

Application No. GB1919106.3, Search Report under Section 17(5) dated Jun. 4, 2020.

* cited by examiner

LOCKING DEVICE

CROSS-REFERENCE TO RELATED APPLICATIONS

This application claims the benefit of Great Britain Patent Application Nos. 1910474.4, filed on Jul. 22, 2019, and 1919106.3, filed on Dec. 20, 2019, each of which is incorporated herein by reference in its entirety.

BACKGROUND OF THE INVENTION

The present invention relates to a locking device for securing a toolbox with respect to a support structure and in particular, but not exclusively, for securing a wheeled toolbox with respect to a support structure.

The present invention also relates to a toolbox assembly comprising a toolbox and a locking device, a kit of parts and a method of securing a toolbox with respect to a support structure.

Toolboxes are used to store and organise tools, as well as to protect such items from damage or from being stolen. They are typically used in garages and other similar environments in which tools are used. Some toolboxes are typically mounted on wheels (e.g. castor wheels) for ease of transport of the toolbox, by rolling the toolbox along the floor.

However the contents of the toolbox, and the toolbox itself, may be of substantial value, making them a target for thieves. This is particularly the case for a toolbox with one or more rollable ground engagement members (e.g. a wheel, roller, ball, etc.), due to its ease of mobility.

The present invention seeks to mitigate the above-mentioned problems. Alternatively or additionally, the present invention seeks to provide an improved locking device for securing a toolbox with respect to a support structure. Alternatively or additionally, the present invention seeks to provide an improved toolbox assembly comprising a toolbox and a locking device for securing the toolbox with respect to a support structure. Alternatively or additionally, the present invention seeks to provide an improved method of securing a toolbox with respect to a support structure.

SUMMARY OF THE INVENTION

According to a first aspect of the invention there is provided a locking device for securing a toolbox with respect to a support structure, the locking device comprising:
 a housing for receiving at least part of a ground engagement mechanism of a toolbox;
 the housing being securable to a support structure;
 the housing being configurable to have an opening, or having an opening, through which at least part of a ground engagement mechanism of a toolbox may be inserted into and removed from the housing;
 the locking device comprising a retaining mechanism that is movable between a retaining configuration, that prevents the removal of the at least part of the ground engagement mechanism from the housing through the opening, and a releasing configuration that allows the removal of the at least part of the ground engagement mechanism from the housing through the opening;
 wherein the retaining mechanism comprises a retaining member that is movable between a first position such that the retaining mechanism is in the retaining configuration and a second position such that the retaining mechanism is movable to, or is in, the releasing configuration;
 the locking device comprises a lock configured such that the retaining member is selectively lockable in its first position;
 and wherein the locking device comprises a retaining member protector configured to substantially prevent access to at least part of the retaining member through the opening, when the retaining member is in the first position.

In this respect, the retaining member protector substantially prevents access to at least part of the retaining member through the opening, which may prevent the retaining member from being tampered with, through the opening. This may therefore provide a locking device, for securing a toolbox with respect to a support structure, that is particularly secure.

The retaining member protector may substantially prevent access to the at least part of the retaining member by preventing access through the opening. Alternatively, it may allow access through the opening but prevent this access through the opening from accessing the at least part of the retaining member.

Optionally the retaining member protector covers the at least part of the retaining member, when the retaining member is in the first position. Optionally the retaining member receives the at least part of the retaining member, when the retaining member is in the first position. Optionally the retaining member protector is positioned between the at least part of the retaining member and the opening, and/or at the opening, along a projection of the at least part of the retaining member on to the opening, i.e. on to a plane in which the opening extends.

Optionally the retaining member protector is positioned such that the retaining member protector and the at least part of the retaining member overlap along an axis that is perpendicular to the plane of the opening and passes through the at least part of the retaining member. In this respect, optionally projections of the retaining member protector and of the retaining member, on the plane of the opening, overlap.

Optionally when the retaining member is in its first position it extends between first and second walls of the housing. Optionally the retaining member protector extends at least part way along the length of the retaining member between the first and second walls. Optionally the retaining member protector extends substantially along the length of the retaining member between the first and second walls.

The retaining member protector may extend at least partially around the perimeter (e.g. the circumference) of the retaining member (when the retaining member is in its first position). The retaining member protector may extend substantially around the perimeter (e.g. the circumference) of the retaining member.

The retaining member protector may be configured to substantially prevent access to substantially the entire portion of the retaining member that extends between the first and second walls (when the retaining member is in its first position).

The retaining member protector may be of any type, including a sleeve, abutment, obstruction, etc. and may have any suitable shape. The retaining member protector may be tubular. It may define a circumferential and/or lengthwise section of a tube. It may have any cross-sectional shape, including circular, square, etc. In a preferred embodiment the retaining member protector comprises a sleeve. In a preferred embodiment the sleeve is cylindrical (i.e. has the shape of a hollow cylinder).

The retaining member may be of any type, including a pin, bolt, abutment, obstruction, etc. and may have any suitable shape. For example the retaining member may have any cross-sectional shape, including circular, square, etc. In a preferred embodiment the retaining member has a substantially circular cross-sectional shape.

Optionally the retaining member is movable between its first and second positions to vary the amount it extends across the opening. In this respect, optionally when the retaining member is in its first position it extends across the opening more than when the retaining member is in its second position.

Optionally when the retaining member is in its first position it obstructs the opening to an extent that prevents the at least part of the retaining member being removed from the housing through the opening. Optionally when the retaining member is in the second position it does not obstruct the opening to an extent that prevents the at least part of the retaining member being removed from the housing through the opening, i.e. it allows the at least part of the retaining member to be removed through the opening.

Optionally when the retaining member is in its first position it extends substantially across the opening. In this respect, it may extend across the extent of at least one dimension of the opening, for example it may extend across the length of the opening (e.g. where the opening is defined by a pair of opposed parallel walls, the length being the direction perpendicular to the walls).

Optionally when the retaining member is in its second position it does not extend across the opening. When the retaining member is in its second position it may be positioned external to the housing.

The opening may be defined by opposed first and second walls of the housing. When the retaining member is in its first position it may extend between the walls, i.e. from the first wall to the second wall. It may extend between inner surfaces of the walls the define the opening. When the retaining member is in its first position is may extend along an axis that is substantially perpendicular to the planes of the walls.

Optionally the retaining mechanism comprises a cover that is movable relative to the opening, between an open position and a closed position, to vary the amount that it covers the opening.

In this respect, when the cover is in the closed position it closes the opening more than when the cover is in the open position. When the cover is in the open position the opening may be entirely open (i.e. not covered by the cover). When the cover is in the closed position the opening may be substantially closed by the cover.

The cover may provide additional security to the locking device since, when it is in the closed position, it may prevent access to at least part of the retaining member and/or ground engagement mechanism. In this respect, the cover may be the, or part of the, retaining member protector. It will be appreciated that the cover may form both the, or part of the, retaining mechanism and retaining member protector. Alternatively the cover may only form the, or part of the, retaining mechanism.

In embodiments of the invention, when the retaining member is in its first position it retains the retaining mechanism in its retaining configuration.

Optionally when the cover is in its open position it is positioned relative to the opening such that the at least part of the ground engagement mechanism can be inserted into and removed from the housing through the opening and when the cover is in its closed position it covers the opening to an extent that it prevents the removal of the at least part of the ground engagement mechanism from the housing through the opening. Optionally when the retaining member is in its first position it retains the cover in its closed position.

Optionally when the cover is in its closed position it forms the, or part of the, retaining member protector.

In this respect, optionally when the cover is in its closed position it substantially prevent access to at least part of the retaining member through the opening, when the retaining member is in its first position.

Optionally when the cover is in the closed configuration it substantially closes the opening.

Optionally the cover is selectively attachable and detachable from the housing such that when the cover is in its closed position it is attached to the housing and when it is in its open position it is detached from the housing.

Having the cover detached from the housing, when it is in its open position, may allow the ground engagement mechanism to be rolled into the housing (e.g. along a floor).

Optionally one of the cover or housing comprises a male member and the other comprises a female member, the male and female members being selectively engageable and disengageable with each other to selectively attach and detach the cover to the housing. This may provide a particularly strong and secure engagement of the cover with the housing.

Optionally when the cover is in its closed position the male member is received by the female member.

The male and female members may be any type for formations that are such that the male member is receivable by the female member to selectively attach the cover to the housing. For the example, the male member may be a protrusion, tab, plug, etc. and the female member may be an aperture, slot, recess, socket, etc.

The female member may comprise a slot and the male member may comprise a protrusion that is receivable in the slot. The slot may be provided in a wall of the housing and the protrusion may be provided on the cover. Alternatively, the protrusion may be provided on a wall of the housing and the slot may be provided in the cover.

Optionally the one of the cover or housing comprises a plurality of said male members and the other comprises a plurality of said female members, the respective male and female members being selectively engageable and disengageable with each other to selectively attach and detach the cover to the housing.

One of the cover or housing may comprise a pair of slots and the other may comprise a pair of protrusions that are receivable in the slots to attach the cover to the housing and are removable from the slots to detach the cover from the housing.

The male or female members may be provided in or on side walls of the housing, located on opposite sides of the opening.

Optionally the locking device comprises a mounting side, for mounting the toolbox thereon, such that the at least part of the ground engagement mechanism of the toolbox is received in the housing and wherein the locking device is configured such that as the cover is moved to its closed position, it does not extend past the mounting side of the housing.

The cover may be movable from an engagement position, in which the cover is first engaged with the housing, to its closed position (and vice-versa).

The locking device may be configured such that as the cover is moved from its engagement position to its closed position, it does not extend past the mounting side of the housing.

This is advantageous in that it may prevent the cover from clashing with a body of the toolbox, as the cover is moved to its closed position.

The locking device may be configured such that as the cover is moved from its engagement position to its closed position, it rotates relate to the housing. In this respect, a side (e.g. an edge) of the cover may move along an arc as the cover is moved from its engagement position to its closed position.

The male and female member(s) may be configured to provide this movement of the cover. In this respect, the male and female member(s) may be configured such that as the cover is moved from its engagement position to its closed position, it does not extend past the mounting side of the housing.

In this respect, the male and female member(s) may be configured to rotatably mount the cover to the housing such that the cover is rotatable between its engagement position and its closed positon. The male and female member(s) may be configured to form a hinge about which the cover rotates from its engagement position to its closed position. The male and female member(s) may have surfaces that bear against each other to provide said rotational mounting. These surfaces may be shaped such that as the cover is moved from its engagement position to its closed position, it does not extend past the mounting side of the housing.

Optionally the locking device comprises a mounting side, for mounting the toolbox thereon, such that the at least part of the ground engagement mechanism of the toolbox is received in the housing, and wherein the locking device comprises an abutment configured to allow the at least part of the ground engagement mechanism to be received in the housing through the opening but to prevent the at least part of the ground engagement mechanism from being removed through an opening in the mounting side.

Optionally the housing comprises opposed first and second side walls that are spaced apart to provide said opening, between the side walls, and wherein an abutment extends between the first and second side walls.

The abutment may be configured to allow the at least part of the ground engagement mechanism to be received in the housing through the opening but to prevent the at least part of the ground engagement mechanism from being removed through an opening in the mounting side.

Because the abutment extends between the first and second side walls, this may advantageously allow the abutment to be relatively short (in the longitudinal direction) and yet still prevent a wheel of a ground engagement member being removed through the opening in the mounting side. In this respect because the abutment extends between the first and second side walls it may prevent a wheel of a ground engagement mechanism from being rotated diagonally (such that it extends across a diagonal of the housing, which may be the largest dimension of the housing) so as to try and pass the wheel through the opening in the mounting side, whilst still being relatively short in the longitudinal direction (i.e. in the fore-aft direction of the housing). This may prevent, or reduce, the abutment rubbing against the wheel as the wheel is inserted into, and removed from, the housing.

The abutment may extend from the first side wall to the second side wall. The abutment may extend from the first side wall to the second side wall along a lateral axis that is substantially perpendicular to the first and second side walls.

In this respect, the first and second side walls may each generally extend in a respective plane. The planes of the first and second side walls may be substantially parallel to each other. The abutment may extend from the first side wall to the second side wall along a lateral axis that is substantially perpendicular to the planes of the first and second side walls.

The abutment may be located at a rear of the housing. The abutment may extend forwardly from a rear wall of the housing. The abutment may extend forwardly from the rear wall of the housing along a longitudinal axis that is substantially perpendicular to the rear wall of the housing. In this respect, the rear wall may generally extend in a plane, wherein the abutment extends forwardly from the rear wall along a longitudinal axis that is substantially perpendicular to the plane of the rear wall.

The abutment may be positioned such that a space is provided between the abutment and a side of the housing opposite the mounting side (for example a lower side of the housing, which may be an open side of the housing). In this respect the space may be provided underneath the abutment. The space may be for receiving at least part of a wheel of a ground engagement mechanism, The abutment may be located proximal to the mounting side of the housing. The abutment may be located at the mounting side of the housing. An outer surface of the abutment may be substantially flush with the mounting side of the housing.

The abutment may have a front face that is substantially flat and substantially contained in a plane that is perpendicular to the first and second side walls (i.e. to the planes of the first and second side walls).

The abutment may be planar. The abutment may be contained in a plane that is substantially perpendicular to the first and second side walls. The abutment may be a plate, optionally a thin plate.

The mounting side of the housing may, for example, be an upper side of the housing (i.e. the upper side when in use). The opening may be provided in a first side of the housing and the mounting side may be a second side of the housing. The first and second sides of the housing may be adjacent to each other.

Optionally the opening is a first opening and the housing is provided with a second opening through which a part of the toolbox may extend out of the housing when the at least part of the ground engagement mechanism is received in the housing. This may be a part of the ground engagement mechanism (e.g. that connects to another part of the toolbox (e.g. to the body of the toolbox)).

The second opening may be connected to the first opening to allow the at least part of the ground engagement mechanism to be received in the housing. The abutment may be configured to prevent the at least part of the ground engagement mechanism from being removed through the second opening.

The second opening may be in the mounting side of the housing.

The abutment may be configured to, in combination with a part of the locking device, define a gap. The gap may be small enough that the at least a part of the ground engagement mechanism cannot be removed from the housing through the gap and out through the second opening. The part of the locking device may, for example, be the retaining member, when the retaining member is in the first configuration, and/or the retaining member protector (e.g. the sleeve).

The abutment may be configured to accommodate the at least part of the ground engagement mechanism that is received in the housing and/or the part of the toolbox that extends out of the housing such that it does not prevent the at least part of the ground engagement mechanism being received in the housing.

The abutment may be configured to accommodate the mounting mechanism of the ground engagement mechanism (see below). The coupling part may be one or more arms that attach the axle of the ground engagement mechanism to the body of the toolbox. The abutment may be configured to be received between, optionally to be slid between, the ground engagement mechanism and the coupling part.

The abutment may be mounted on a side of the housing, proximal to the mounting side of the housing. The abutment may extend into the internal space defined by the housing.

Optionally the retaining member protector comprises a protective sleeve that receives at least part of the retaining member when it is in its first position to substantially prevent access to the at least part of the retaining member through the opening.

Optionally the locking device is configured such that when the retaining member is in its first position it prevents the removal of the at least part of the ground engagement mechanism from the housing through the opening by obstructing a part of the toolbox.

This may provide a particularly secure arrangement. The part of the toolbox that is obstructed may, for example, be a part of the ground engagement mechanism, for example a ground engagement member and/or mounting that mounts the ground engagement member to the toolbox body. This may be the at least part of the ground engagement mechanism that is in the housing. Alternatively, or additionally, it may be a part of the ground engagement mechanism that is external to the housing.

Optionally the locking device is configured such that when the retaining member is in its second position, the retaining member protector is movable to, or is in, a position that allows the removal of the ground engagement mechanism from the housing through the opening.

Optionally when the retaining member is in its first position it, and/or the retaining member protector provides an obstruction that acts to prevent the removal of the at least part of the ground engagement mechanism from the housing through the mounting side. In this respect, when the retaining member is in its first position it, and/or the retaining member protector, may, in combination with a part of the locking device, define a gap that is small enough that the at least a part of the ground engagement mechanism cannot be removed from the housing through the gap and out through the second opening. The part of the locking device may, for example, be said abutment.

Optionally the retaining member protector is coupled to the cover such that when the cover is in its open position, the retaining member protector is in a position that allows the removal of the at least part of the ground engagement mechanism from the housing through the opening.

In embodiments of the invention the lock is movable between a locking configuration in which the retaining member is locked in its first position (i.e. it cannot be moved to its second position) and an unlocked configuration in which the retaining member is moveable from its first position to its second position.

The lock may comprise any sort of lock. In embodiments of the invention the lock is a mechanical lock, more specifically a cylinder lock in the form of a barrel lock. However, it will be appreciated that an electrical, electro-mechanical, radio frequency, or any other type of lock, could be used. In embodiments of the invention the lock is a key lock, i.e. it requires a key to lock and unlock it. In embodiments of the invention the key is a mechanical key.

In embodiments of the invention the locking device comprises a securing member configured to secure the housing with respect to a support structure (e.g. a floor, wall, etc.). The securing member may be configured to secure the housing to the support structure either on its own or in combination with one or more complimentary securing members (e.g. fasteners such as screws or bolts, or a complimentary securing member secured to the support structure, that is engageable with the securing member). The securing member may, for example, comprise a plate, bracket other fixture that is attachable to the support surface. The securing member may have one or more attachment formations, for example an aperture, recess or depression for engagement with a fastener or complimentary formation of the support surface.

According to a second aspect of the invention there is provided a locking device for securing a toolbox with respect to a support structure, the locking device comprising:
  a housing for receiving at least part of a ground engagement mechanism of a toolbox;
  the housing being securable to a support structure;
  the housing being configurable to have an opening, or having an opening, through which at least part of a ground engagement mechanism of a toolbox may be inserted into and removed from the housing;
  the locking device comprising a retaining mechanism that is movable between a retaining configuration, that prevents the removal of the at least part of the ground engagement mechanism from the housing through the opening, and a releasing configuration that allows the removal of the at least part of the ground engagement mechanism from the housing through the opening;
  wherein the retaining mechanism comprises a retaining member that is movable between a first position such that the retaining mechanism is in the retaining configuration and a second position such that the retaining mechanism is in the releasing configuration;
  the locking device comprises a lock configured such that the retaining member is selectively lockable in its first position;
  and wherein the locking device comprises a retaining member protector comprising a protective sleeve that receives at least part of the retaining member when it is in its first position to substantially prevent access to the at least part of the retaining member.

Optionally the locking device is configured such that when the retaining member is in its first position it prevents the removal of the at least part of the ground engagement mechanism from the housing through the opening by obstructing a part of the toolbox.

When the retaining member is in its first position it may prevent the removal of the at least part of the ground engagement mechanism from the housing by obstructing a part of the ground engagement mechanism. This may be the at least part of the ground engagement mechanism that is in the housing.

According to a third aspect of the invention there is provided a toolbox assembly comprising a toolbox and a locking device according to the first, second, seventh or eighth aspects of the invention, wherein at least a part of the ground engagement mechanism of the toolbox is retained in the housing of the locking device to secure the toolbox with respect to a support structure.

It will be appreciated that the at least a part of the ground engagement mechanism of the toolbox is retained in the housing of the locking device by the retaining member in its first position. The retaining member may be locked in its first position by the lock.

In embodiments of the invention the locking device is secured to a support structure, for example by its securing member.

The toolbox may comprise a toolbox body configured to store one or more tools in a storage space within the toolbox body. The toolbox body may be selectively openable and closable to allow and prevent access to the storage space. The toolbox may have one or more compartments, for storing tools, that are selectively openable and closable.

The toolbox body may be generally cuboidal.

In embodiments of the invention the tool box body is mounted on the ground engagement mechanism.

Optionally, the opening is a first opening and the housing has a second opening and wherein when the toolbox body is mounted on the housing, the toolbox body at least partially closes the second opening. Optionally when the toolbox body is mounted on the housing, the toolbox body substantially closes the second opening.

The ground engagement mechanism may comprise a ground engagement member. The ground engagement member may be configured to be rollable along a surface such that the toolbox is rollable along the surface. In embodiments of the invention the ground engagement member is rotatably mounted (e.g. to a body of the toolbox) such that the toolbox (i.e. a body of the toolbox) is rollable along a surface.

The ground engagement member may be any type of rollable member, including a wheel, roller, ball, etc. In embodiments of the invention the ground engagement member is a castor wheel. In embodiments of the invention the ground engagement member is a rollable ground engagement member. In embodiments of the invention the ground engagement mechanism is a rollable ground engagement mechanism.

The ground engagement mechanism may be configured such that the ground engagement member is rotatable about a first axis, such that the toolbox is rollable along a surface, and a second axis that is substantially perpendicular to the first axis. The first axis may be substantially horizontal and the second axis may be substantially vertical.

The ground engagement member may be mounted to the toolbox body by a mounting mechanism (which forms part of the ground engagement mechanism). The ground engagement member may be rotatably mounted to the mounting mechanism such that toolbox is rollable along a surface (i.e. about said first axis). The mounting mechanism may be rotatably mounted to a body of the toolbox such that the ground engagement member is rotatable about said second axis.

The toolbox may comprise a plurality of said ground engagement mechanisms. The toolbox may comprise first and second pairs of said ground engagement mechanisms. The first and second pairs may be provided on opposites sides of the toolbox body, for example opposite sides in the width direction of the toolbox body.

A first of said pairs of ground engagement mechanisms may be configured such that each ground engagement member, of the pair, is rotatable about is rotatable about said first axis but not said second axis.

A second of said pairs of ground engagement mechanisms may be configured such that each ground engagement member, of the pair, is rotatable about said first and second axes.

Optionally the housing of the locking device receives at least a part of a ground engagement mechanism of the second pair. Alternatively, the housing may receive at least a part of a ground engagement mechanism of the first pair.

In embodiments of the invention the lock has an interface configured to interface with a key to lock and unlock the lock. For example, where the lock is a mechanical key lock, the interface may be a key hole. Where the lock is an RFID lock, the interface may be a detector configured to detects an RFID card, for example.

Optionally the locking device is oriented such that its interface faces inwardly and/or towards a wall that the toolbox is adjacent to, preferably immediately adjacent to, more preferably in contact with. This may act to further prevent unauthorised tampering with the lock. In relation to the interface facing inwardly, the locking device may be oriented such that its interface faces underneath the toolbox. The locking device may be oriented such that its interface faces away from the external surroundings of the toolbox.

According to a fourth aspect of the invention there is provided a kit of parts comprising:
  a toolbox having a ground engagement mechanism; and
  a locking device according to the first, second, seventh or eighth aspects of the invention, wherein the housing of the toolbox is for receiving at least part of the ground engagement mechanism of the toolbox and when the retaining mechanism is in its retaining configuration it prevents the removal of the at least part of the ground engagement mechanism from the housing.

According to a fifth aspect of the invention there is provided a method of securing a toolbox with respect to a support structure, the method comprising:
  securing a locking device to a support structure;
  receiving at least part of a ground engagement mechanism of a toolbox in a housing of the locking device, through an opening in the housing;
  placing a retaining mechanism of the locking device in a retaining configuration, that prevents the removal of the at least part of the ground engagement mechanism from the housing through the opening, by moving a retaining member of the retaining mechanism to a first position;
  and locking the retaining member in the first position;
  and wherein the locking device comprises a retaining member protector that substantially prevents access to at least part of the retaining member through the opening, when the retaining member is in the first position.

Optionally the step of receiving at least part of a ground engagement mechanism of a toolbox in the housing of the locking device, through the opening in the housing, comprises rolling the ground engagement mechanism along the support structure and (at least partly) into the housing. In this respect, it comprises rolling the toolbox along the support structure on its ground engagement mechanism. Optionally the ground engagement member, of the ground engagement mechanism, is received in the housing.

According to a sixth aspect of the invention there is provided a method of securing a toolbox with respect to a support structure, the method comprising:
  securing a locking device to a support structure;
  receiving at least part of a ground engagement mechanism of a toolbox in a housing of the locking device, through an opening in the housing;
  placing a retaining mechanism of the locking device in a retaining configuration, that prevents the removal of the at least part of the ground engagement mechanism from the housing through the opening, by moving a retaining member of the retaining mechanism to a first position;

and locking the retaining member in the first position;

and wherein the locking device comprises a retaining member protector comprising a protective sleeve that receives at least part of the retaining member when it is in its first position to substantially prevent access to the at least part of the retaining member.

It will be appreciated that in the methods of the fifth and sixth aspects, the steps in the method are not limited to the order presented. For example, the step of securing the locking device to a support structure may occur after (or before) the at least part of the ground engagement mechanism is received in the housing.

According to a seventh aspect of the invention there is provided a locking device for securing a toolbox with respect to a support structure, the locking device comprising:

a housing for receiving at least part of a ground engagement mechanism of a toolbox;

the housing being securable to a support structure;

the housing being configurable to have an opening, or having an opening;

the locking device comprising a retaining member that is movable between first and second positions to vary the amount that the retaining member extends across the opening, wherein when the retaining member is in the first position it extends across the opening more than when the retaining member is in its second position;

the locking device comprises a lock configured such that the retaining member is selectively lockable in its first position;

and wherein the locking device comprises a retaining member protector configured to substantially prevent access to at least part of the retaining member through the opening, when the retaining member is in the first position.

According to an eighth aspect of the invention there is provided a locking device for securing a toolbox with respect to a support structure, the locking device comprising:

a housing for receiving at least part of a ground engagement mechanism of a toolbox;

the housing being securable to a support structure;

the housing being configurable to have an opening, or having an opening;

the locking device comprising a retaining member that is movable between first and second positions to vary the amount that the retaining member extends across the opening, wherein when the retaining member is in the first position it extends across the opening more than when the retaining member is in its second position;

the locking device comprises a lock configured such that the retaining member is selectively lockable in its first position;

and wherein the locking device comprises a retaining member protector comprising a protective sleeve that receives at least part of the retaining member when it is in its first position to substantially prevent access to the at least part of the retaining member.

It will of course be appreciated that features described in relation to one aspect of the present invention may be incorporated into other aspects of the present invention. For example, the method of the invention may incorporate any of the features described with reference to the apparatus of the invention and vice versa. The toolbox referred to in the any aspect of the invention may have any of the features of the toolbox referred to in the third aspect of the invention and vice-versa.

DESCRIPTION OF THE DRAWINGS

Embodiments of the present invention will now be described by way of example only with reference to the accompanying schematic drawings of which.

DETAILED DESCRIPTION

Referring to FIGS. 1 to 8 there is shown a locking device 101 according to a first embodiment of the invention. The locking device 101 is for securing a toolbox 180 (see FIGS. 9 and 10) with respect to a support structure 190. In the currently described embodiment the support structure is a floor surface 190. However, it will be appreciated that any suitable support structure may be used, including a wall, a structure that is fixed to a floor or wall, etc.

Figure 9:
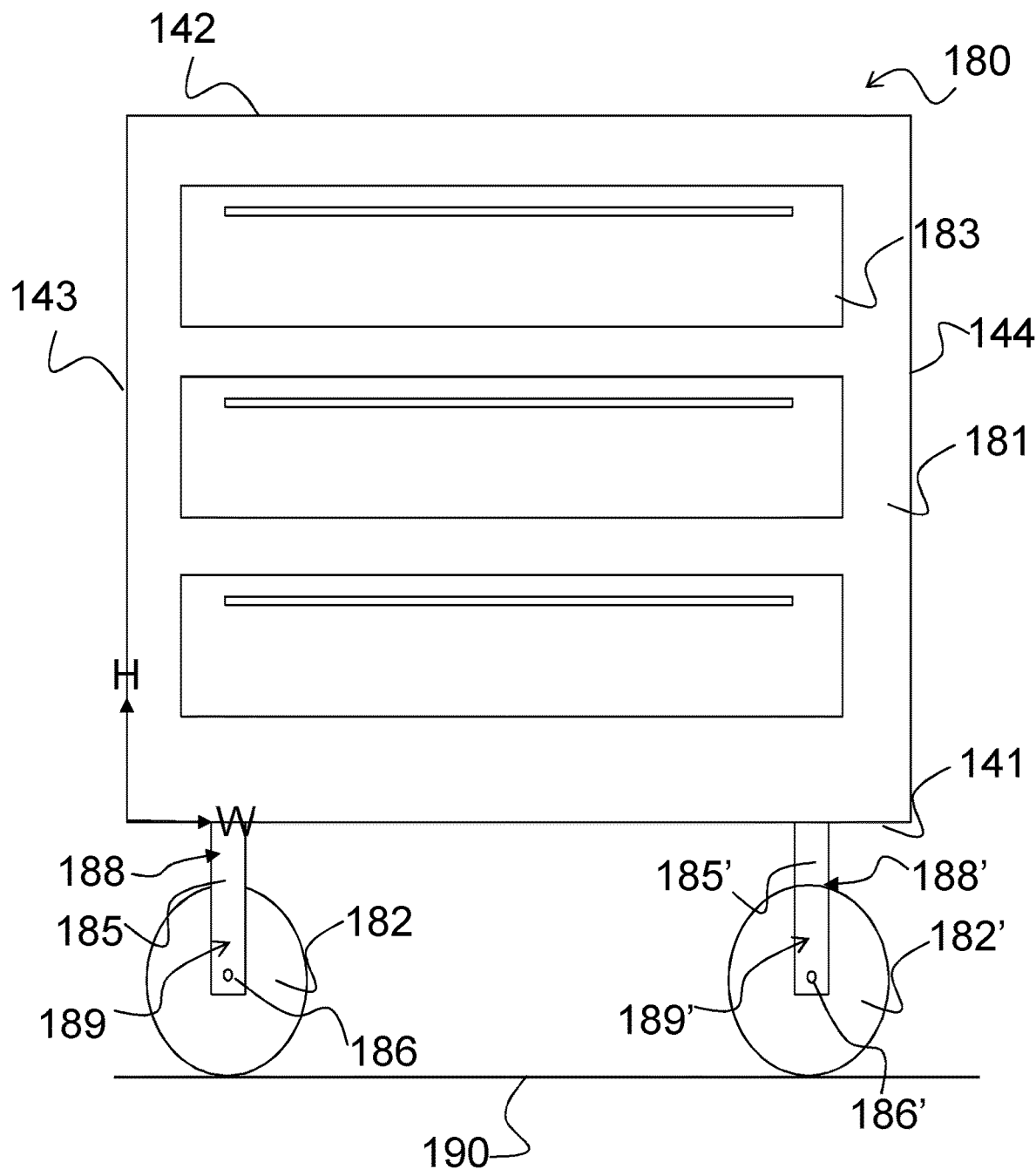
FIG. 9 shows a front view of a toolbox for use with the locking device of the described embodiments of the invention.
Figure 10:
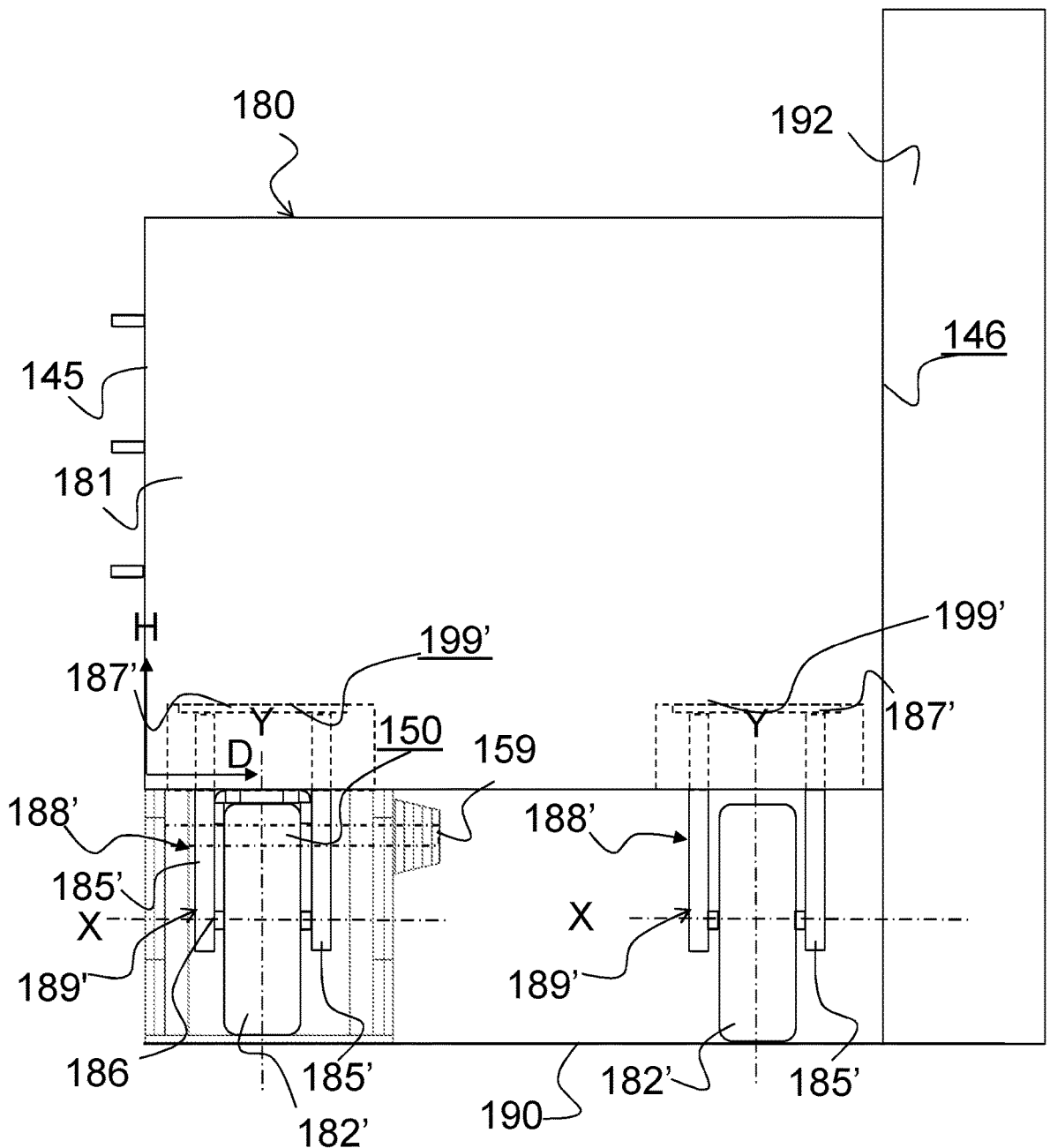
FIG. 10 shows a side view of the toolbox of FIG. 9, where a wheel of the toolbox is received in the housing of the locking device of the first embodiment of the invention (where the rear wall of the housing of the locking device is omitted for illustrative purposes)

With reference to FIGS. 9 and 10, the toolbox 180 comprises a toolbox body 181 mounted on first and second pairs of ground engagement mechanisms 188, 188' that are configured such that the toolbox body 181 is rollable along the floor surface 190.

The toolbox body 181 extends in a height direction (H), between a lower side 141 and an upper side 142, in a width direction (W) between first and second sides 143, 144, and a depth direction (D) between a front and rear side 145, 146, each three of these directions being orthogonal to each other.

The first and second pairs of ground engagement mechanisms 188, 188' are spaced apart in the width direction (W), with the first pair of ground mechanisms 188 mounted on the lower side 141 of the toolbox body 181 proximal its first side 143 and the second pair of ground engagement mechanisms 182 mounted on the lower side 141 of the toolbox body 181 proximal its second side 144.

The ground engagement mechanisms in each pair are spaced apart in the depth direction (D) and are at corresponding positions in the width direction (W) (i.e. they are aligned along the depth direction (D)).

Apart from the differences described below, each ground engagement mechanism 188, 188' is substantially identical and so it will be appreciated that a description of one applies to the others. In the currently described embodiment each ground engagement mechanism 188, 188' comprises a ground engagement member in the form of a castor wheel 182, 182' rotatably mounted on a mounting mechanism in the form of a mounting frame 189, 189', to rotate about a substantially horizontal axis (X). In this respect, the mounting frame 189, 189' comprises a pair of opposed mounting arms 185, 185' that are provided either side of the castor wheel 182, 182' (in the thickness direction of the castor wheel 182, 182'). An axle 186, 186' passes through the centre of the castor wheel 182, 182' and the ends of the axle 186, 186' are fixed to respective first ends of the mounting arms 185, 185' (the ends of the mounting arms 185, 185' that are distal the lower surface 141 of the toolbox body 181). The castor wheel 182, 182' is rotatably mounted on the axle 186, 186' so as to rotate about a substantially horizontal axis (X) (see FIG. 10).

The opposed (second) ends of the mounting arms 185, 185' (that are proximal the lower surface 141 of the toolbox body 181) are connected to each other by a mounting plate 187, 187', which is mounted to the toolbox body 181 in a recess in the lower surface of the toolbox body 181.

This mounting arrangement is such that the toolbox body 181 is rollable on the castor wheels 182, 182', along the floor surface 190.

The mounting plates 187' of the second pair of ground engagement mechanisms 188' are rotatably mounted to the lower surface 141 of the toolbox body 181 so as to rotate about a substantially vertical axis Y. Accordingly, the castor wheels 182' of the second pair are rotatable, relative to the toolbox body 181, about a substantially vertical axis Y (as well as about a substantially horizontal axis X).

The mounting plates 187 of the first pair of ground engagement mechanisms 188 are fixed to the lower surface 141 of the toolbox body 181 so that they do not rotate about the Y-axis. Accordingly, the castor wheels 182 of the first pair only rotate about a substantially horizontal axis X.

The toolbox 180 has a generally cuboidal form. The toolbox body 181 defines an internal tool storage space for storing one or more tools. The tools may be, for example, hand tools and/or power tools. The tools may be for use in any environment where tools are required, for example in an engineering workshop/garage (e.g. an automotive garage).

The toolbox body 181 comprises a number of compartments that together provide the storage space. The compartments are selectively openable and closable by opening/closure arrangements provided in a front side 145 of the toolbox body 181. In this respect, the toolbox body 181 comprises a plurality of drawers 183 that are openable (by sliding the drawers 183 relative to the body 181), to allow access to the internal storage space that they define, and closable to retain the tools in the storage space and/or to prevent access to the tools. It will be appreciated that any suitable type of storage arrangement may be used including where there are one or more compartments that are openable and closable by any type of arrangement (e.g. doors that our pivotable and/or slidable). In the currently described embodiment the rear side 146 of the toolbox body 181 is positioned abutted against a wall 192 (see FIG. 10).

Referring to FIGS. 1 to 8, the locking device 101 comprises a housing 102 having first and second side walls 103, 104 and a rear wall 105, arranged so as to define three sides of a cuboid with generally open front, upper and lower faces.

Figure 1:
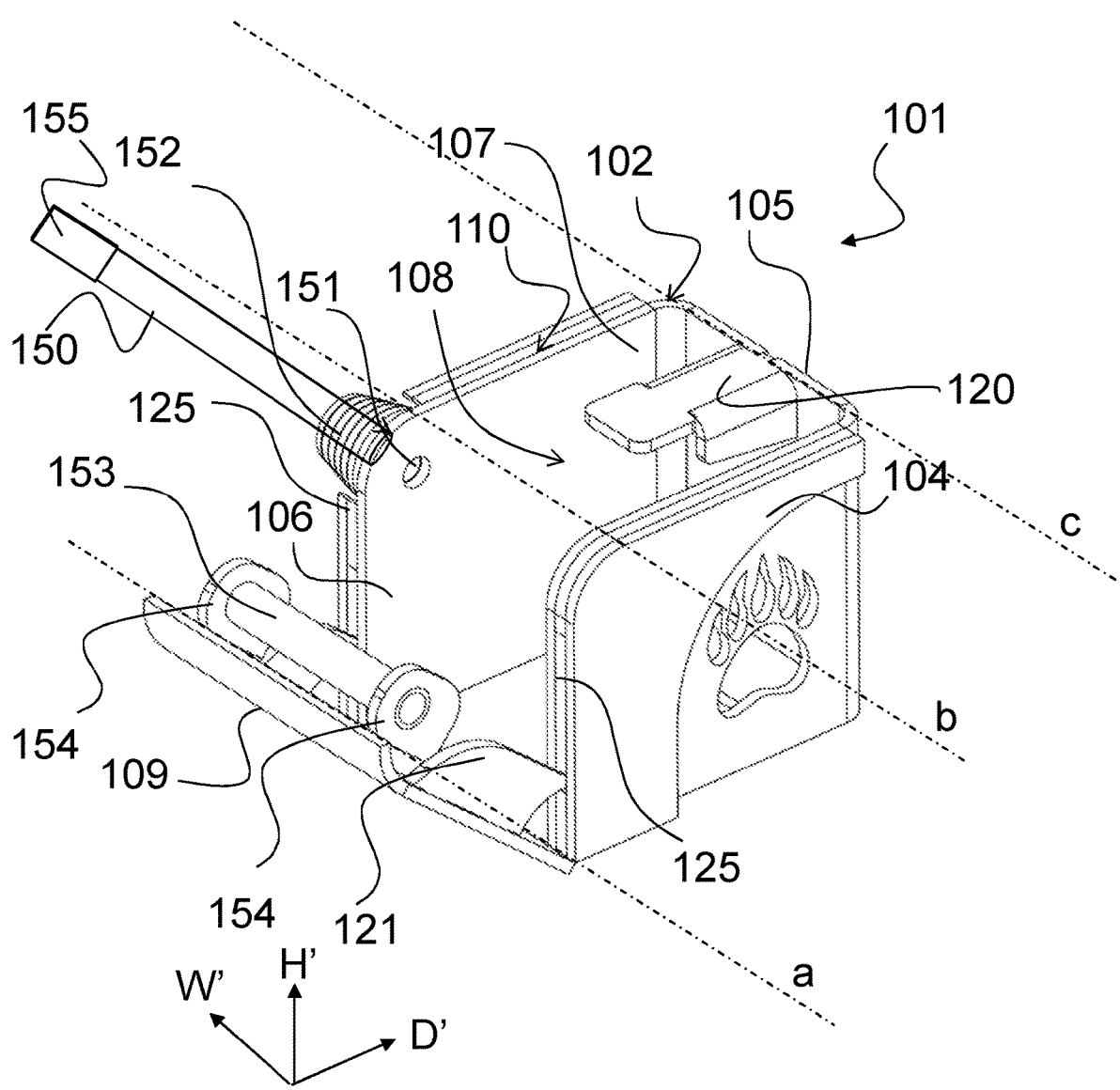
FIG. 1 shows a perspective view of a locking device according to a first embodiment of the invention, where a cover of the locking device is in an engagement position.
Figure 2:
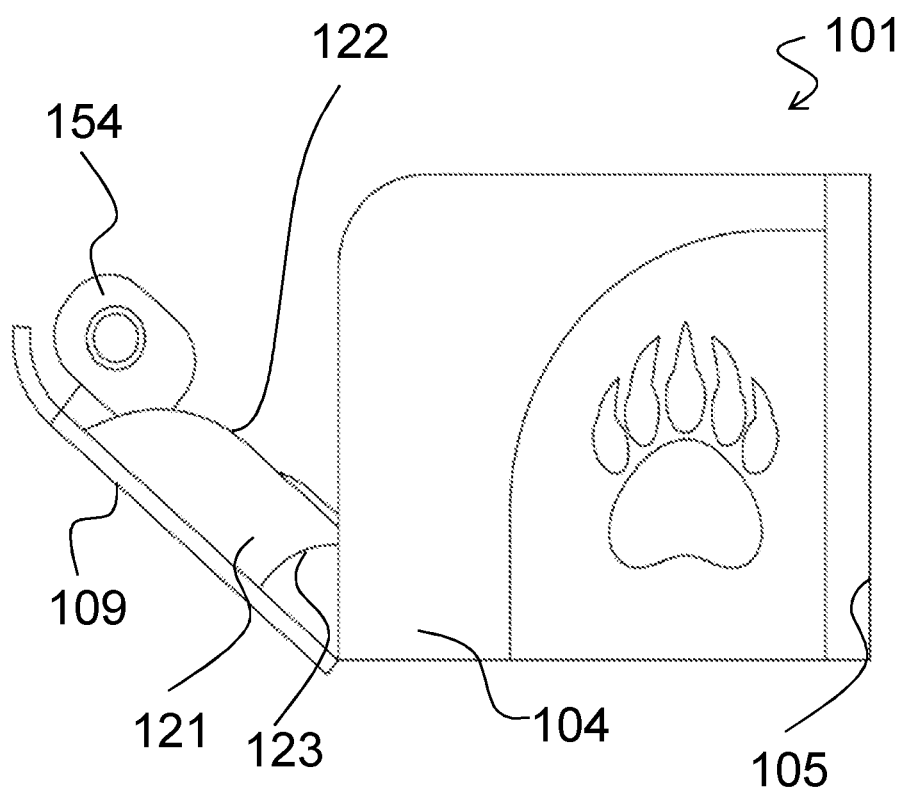
FIG. 2 shows a side view of the locking device as shown in FIG. 1.
Figure 3:
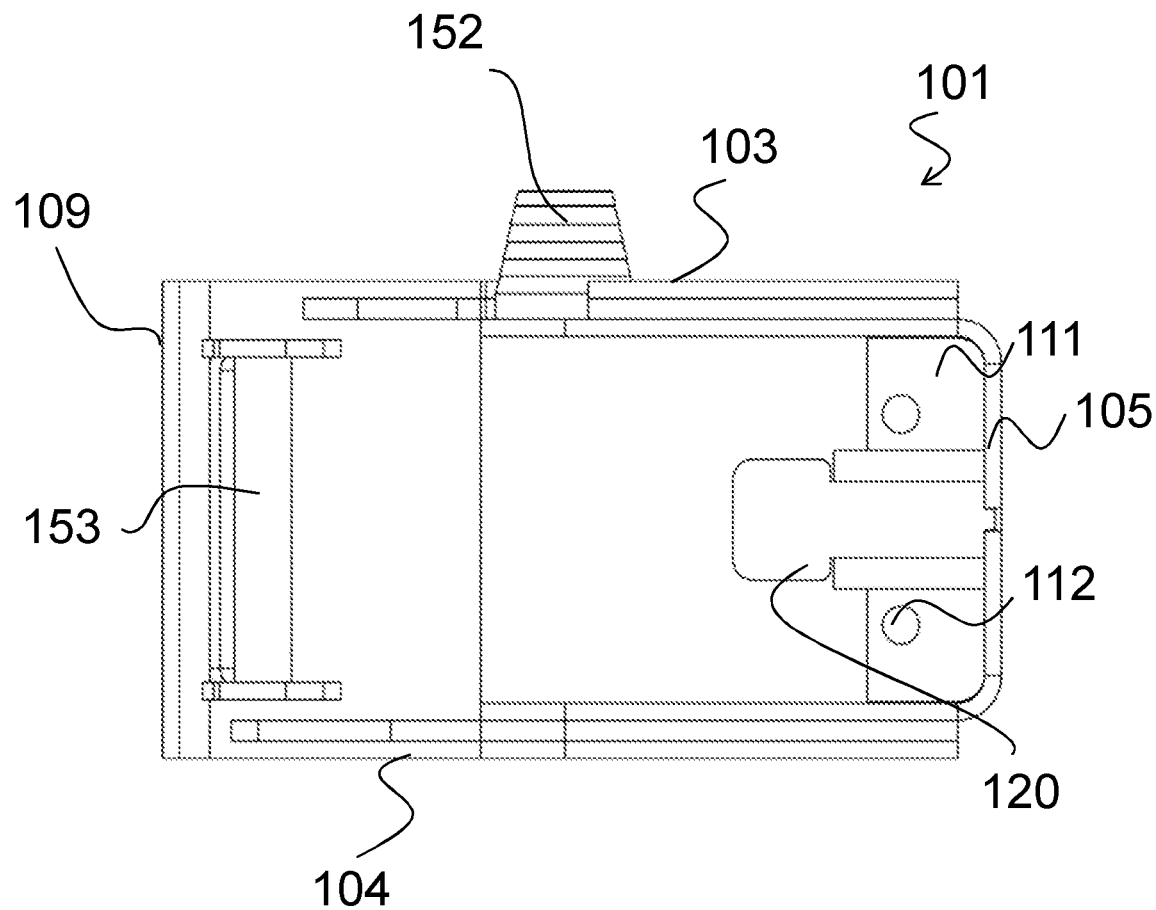
FIG. 3 shows a plan of the locking device as shown in FIG. 1.
Figure 4:
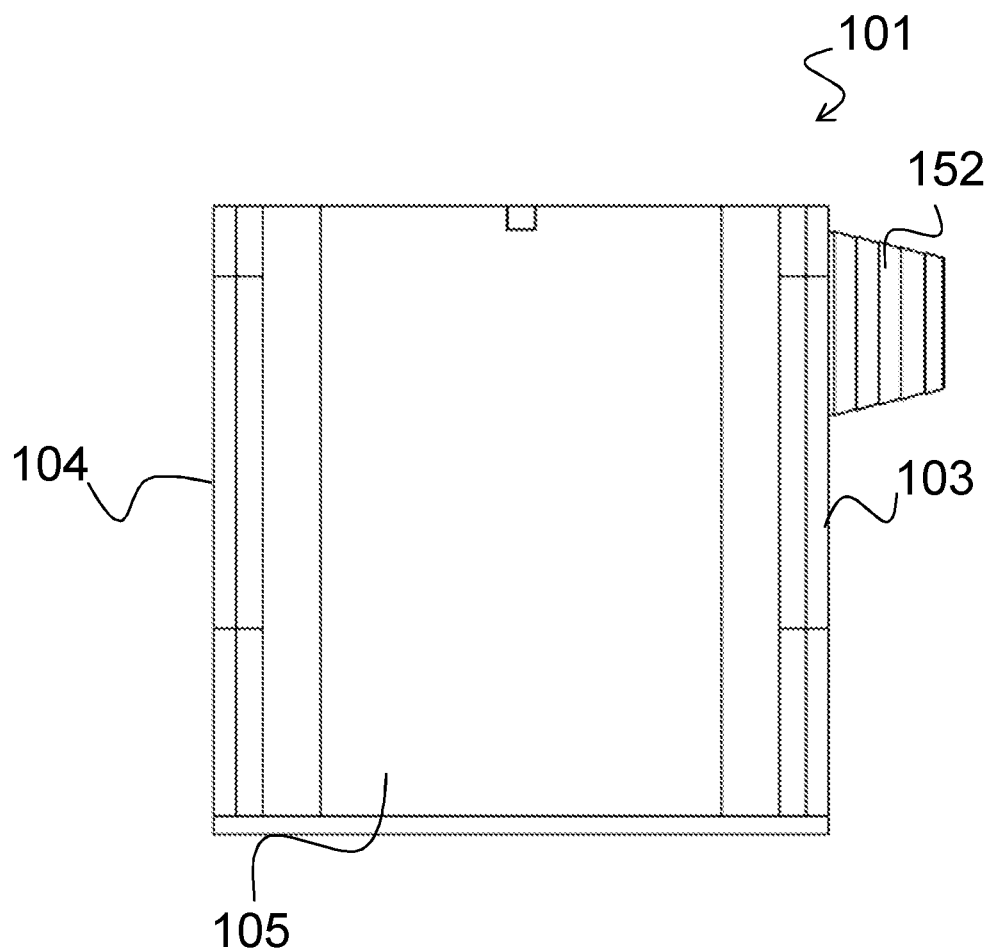
FIG. 4 shows a rear view of the locking device as shown in FIG. 1.

In this respect, the first and second side walls 103, 104 are spaced apart in a width direction (W') of the housing 102 (see FIG. 1). The side walls 103, 104 have substantially the same size and shape and are positioned opposite to each other in the width direction (W') of the housing 102 and at corresponding positions in the depth direction (D') of the housing 102. The first and second side walls 103, 104 are substantially parallel to each other. The rear wall 105 is substantially perpendicular to the first and second side walls 103, 104 and joins rear sides of the first and second side walls 103, 104. The rear wall 105 has the same height (H') as the first and second side walls 103, 104 and the upper and lower sides of the rear wall 105 are aligned with the upper and lower sides of the side walls 103, 104.

The front face of the housing 102 is open. In this respect, a front opening 106 is provided between the front sides of the first and second side walls 103, 104. The front opening 106 extends substantially across the width between the front sides of the first and second side walls 103, 104, substantially across the height of the front sides of the first and second side walls 103, 104 and along respective upper curved corners that join the front sides of the side walls 103, 104 to the upper sides of the side walls 103, 104. The lower and upper bounds of the front opening 106 are shown in FIG. 1 by dotted lines 'a' and 'b' respectively.

The upper face of the housing 102 is also generally open (apart from the upper abutment 120, described below). In this respect, an upper opening 107 is provided between the upper sides of the first and second side walls 103, 104. The upper opening 107 extends across the width between the upper sides of the first and second side walls 103, 104 and across the length of the upper sides in the depth direction (D) of the housing 102 (i.e. from the rear end of the upper corners, that join the front and upper sides of the side walls 103, 104, to the rear wall 105). The front and rear bounds of the upper opening 107 are shown in FIG. 1 by dotted lines 'b' and 'c' respectively.

The side walls 103, 104 and rear wall 105 of the housing 102 define an internal space 108 between them, for receiving a part of one of the ground engagement mechanisms 188, 188' of the toolbox 180 (described in further detail below). It will be appreciated that the internal space 108 extends to the front opening 106 and upper opening 107.

The locking device 101 further comprises a securing plate 111 (see FIG. 3) mounted to the inner face of the rear wall 105 and to rear sections of the first and second side walls 103, 104, at the bottom of these walls. The securing plate 111 protrudes inwardly from the inner face of the rear wall 105, into the internal space 108 and extends generally in plane that is substantially perpendicular to the plane of the rear wall 105. The securing plate 111 is provided with a pair of apertures 112, that are spaced apart in the width direction (W') of the housing 102. Each aperture 112 has a substantially circular cross-sectional shape and extends through the thickness of the securing plate 111, from an upper surface to a lower surface of the securing plate 111. Each aperture 112 is for receiving a fastener, such as a screw or bolt (e.g. an anchor bolt), to secure the housing 102 to the floor surface 190, for example by being received by a mounting arrangement in or on the floor surface 190 (e.g. a receiving aperture in the floor surface). In the currently described embodiment the housing 102 is secured to the floor surface 190 by the securing plate 111 (and suitable fasteners).

Figure 5:
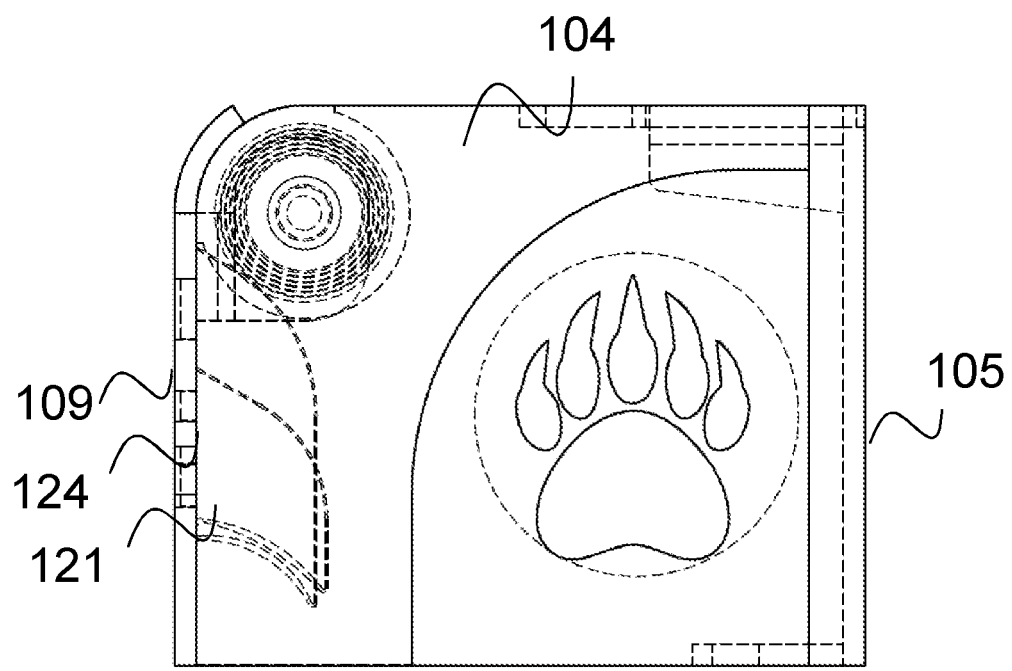
FIG. 5 shows a side view of the locking device shown in FIGS. 1 to 4, but where a cover of the locking device is in a closed position.
Figure 6:
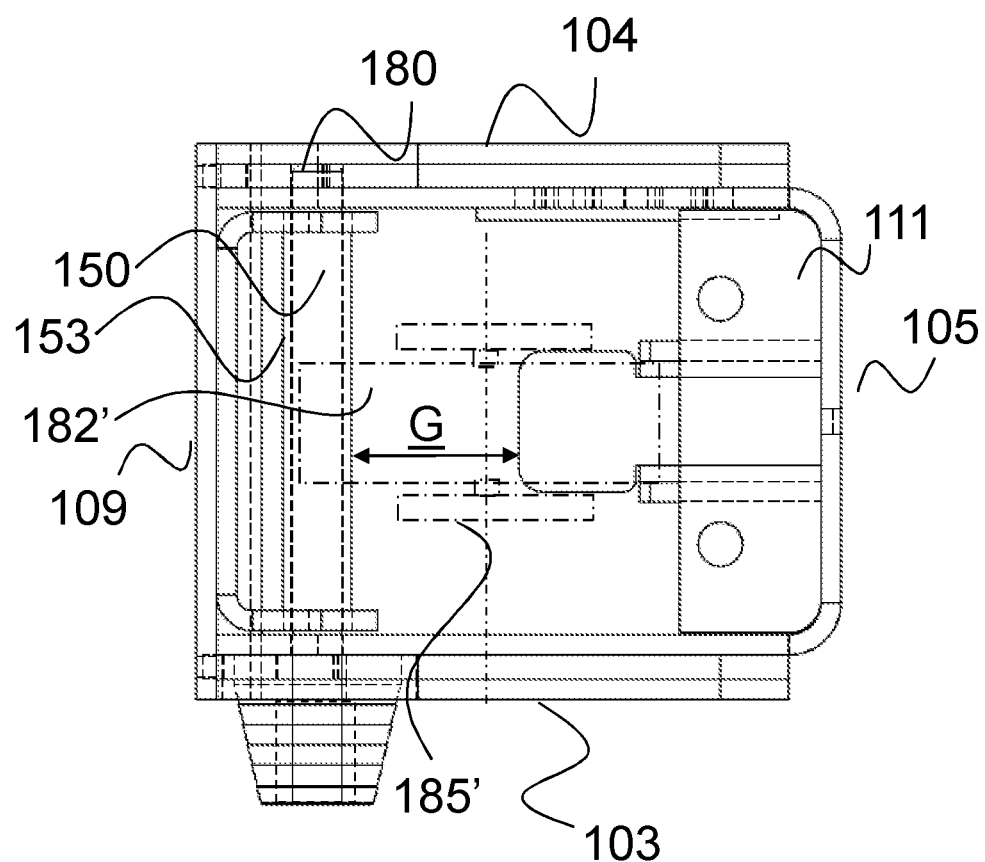
FIG. 6 shows a view from below of the locking device as shown in FIG. 5, where a ground engagement mechanism of a toolbox, received within the housing of the locking device, is shown in phantom for illustrative purposes and where a retaining pin is in a first position.
Figure 7:
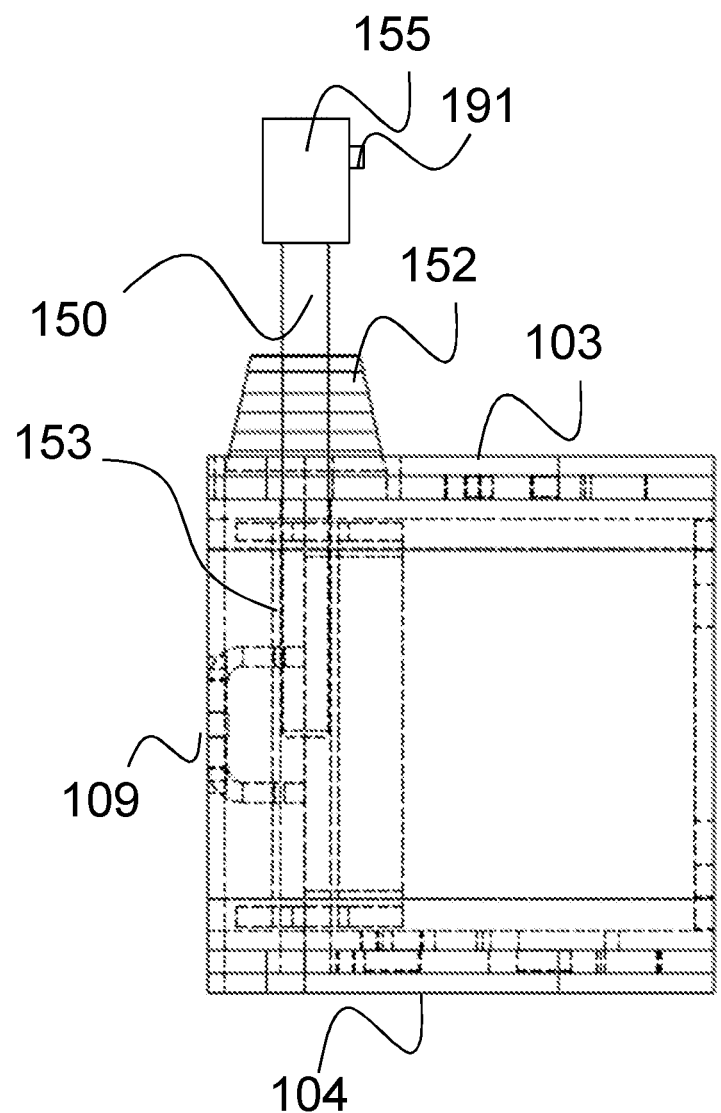
FIG. 7 shows a view from above of the locking device as shown in FIG. 5, where a retaining pin is in between its first and second positions.
Figure 8:
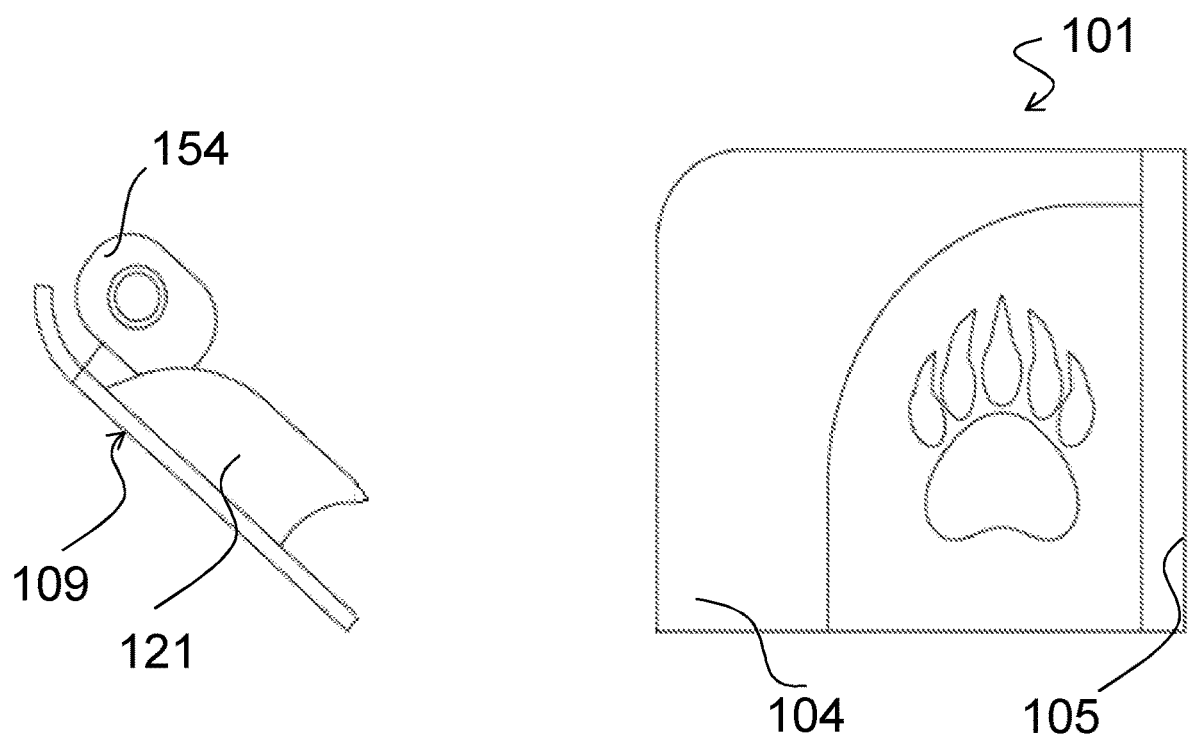
FIG. 8 shows a view corresponding to that of FIG. 2, but where the cover is in an open position.

The locking device 101 further comprises a cover 109. The cover 109 is movable relative to the front opening 106 between an open position (as shown in FIG. 8), in which the cover 109 is detached from the housing, and a closed position (as shown in FIGS. 5 and 6).

The cover 109 is selectively attachable to and detachable from the housing 102 such that when the cover 109 is in its closed position it is attached to the housing 102 and when it is in its open position it is detached from the housing 102 (described in more detail below).

In this respect, when the cover 109 is in its open position it does not cover the front opening 106, or only covers the front opening 106 to an extent that the part of the ground engagement mechanism 188, 188' can be inserted into and removed from the housing 102 through the front opening 106.

In order to insert the part of the ground engagement mechanism 188, 188' into the housing 102, the cover 109 is placed in its open position and the toolbox 180 is rolled across the floor surface 190, on its castor wheels 182,182' such that a castor wheel 182, 182' is rolled into the housing 102, through the front opening 106 in the housing 102.

When the toolbox 180 is in this position, the body 181 of the toolbox 180 slides onto an upper side 110 of the housing 102, which will be referred to as the mounting side 110. In this respect, the toolbox body 181 is mounted on, and is in abutment with, the upper sides of the side walls 103, 104 and rear wall 105. The lower surface 141 of the toolbox body 181 substantially closes the upper opening 107 of the housing 102.

The cover 109 has the shape of a plate that is generally flat but, towards its upper side edge, curves rearwardly, i.e. towards the rear wall 105 of the housing 102 (the term 'upper side edge' being used to refer to the upper side edge of the cover 109 when it is in its closed position). The flat part of the cover 109 has a height and width that corresponds to that of the front face of the housing 102. The curved part of the cover 109 is curved such that it has a complimentary shape to the rounded front corners of the housing 102. In this respect when the cover 109 is in its closed position it forms a substantially close fit with the front face and rounded front corners of the housing 102.

The cover 109 is provided with a pair of side flanges 121. The side flanges 121 are each provided on the rear face of the cover 109 (i.e. the face of the cover 109 that faces rearwardly, into the internal space 108, when the cover 109 is in its closed position) and are spaced apart in the width direction (W'), at opposite sides of the cover 109 with respect to the width direction (W'). Each side flange 121 protrudes rearwardly from the rear face of the cover 109.

Each side flange 121 has curved upper and lower surfaces 122, 123 (see FIG. 2) configured to bear against complimentary upper and lower curved surfaces that define a slot 124 in a respective side wall 103, 104 such that the cover 109 is pivotable, relative to the housing 102, from its engagement position to its closed position (and vice-versa).

In this respect, each of the first and second side walls 103, 104 is provided with an internal slot 124 (see FIG. 5) that extends from a respective slot opening 125 (see FIG. 1) in the front side of the side wall 103, 104, rearwardly into the side wall 103, 104 along a plane generally parallel to the side wall 103, 104. In this respect, each slot 124 is located within the thickness of the side wall 103, 104. Each slot opening 125 has a generally rectangular shape and extends substantially along the height of the front side of the first and second side walls 103, 104.

Each slot 124 is defined by upper and lower surfaces, extending rearwardly, that have a curved complimentary shape to the upper and lower surfaces 122, 123 of the side flanges 121.

The curved shape of the upper and lower surfaces of the slots 124 and flanges 121 are such that the cover 109 is pivotable relative to the housing 102 from an engagement position (shown in FIGS. 1 to 3), in which the side flanges 121 of the cover 109 are first received in the slots 124, to its closed position (shown in FIGS. 5 and 6).

Furthermore, the curved shape of the upper and lower surfaces of the slots 124 and flanges 121 are such that as the cover 109 is moved from its engagement position to its closed position, the cover 109 does not extend above the upper side 110 (i.e. the mounting side) of the housing 102. This is advantageous in that it prevents the cover 109 from clashing with the body 181 of the toolbox 180, as the cover 109 is moved from its engagement position to its closed position (and vice-versa).

Furthermore, because the side flanges 121 of the cover 109 are received in the slots 124 in the side walls 103, 104 of the housing 102, this provides a particularly strong and secure attachment of the cover 109 to the housing 102.

Once the (part of) a ground engagement mechanism 188, 188' has been received in the housing 102, the cover 109 is moved to its engagement position (shown in FIGS. 1 to 3), in which is first attached to the housing 102. The cover 109 is then moved to its closed position (as shown in FIGS. 5 and 6).

When the cover 109 is in its closed position it closes the opening 106 to an extent that it prevents the removal of the (part of) the ground engagement mechanism 188, 188' from the housing 102, through the front opening 106, by obstructing its removal through the front opening 106.

In this respect, when the cover 109 is in its closed position it substantially covers the front opening 106. Although there may be a small gap between the upper edge of the cover 109 and the upper side of the front opening 106), this is too small to allow the (part of the) ground engagement mechanism 188, 188' to pass out of the housing 102.

The locking device 101 further comprises an upper abutment 120. The upper abutment 120 is mounted on an inner face of the rear wall 105 of the housing 102, towards the upper side of the rear wall 105. The abutment 120 extends forwardly from the rear wall 105, into the internal space 108. The abutment 120 is positioned and shaped so as to fit between the castor wheel 182, 182' and the lower surface 141 of the toolbox body 181, and between the mounting arms 185 of the castor wheel 182, 182' as the (part of the) ground engagement mechanism 188, 188' is received within the housing 102. This allows the (part of) the ground engagement mechanism 188, 188' to enter into the housing 102 through the front opening 106.

However the abutment 120, in combination with a retaining pin 150 (and protective sleeve 153), prevents an obstacle to the removal of the castor wheel 182 out of the upper opening 107 (described further below).

The locking device 101 also comprises a retaining member in the form a retaining pin 150 (see FIG. 6). The retaining pin 150 is a cylindrical pin and is slidably mounted in a mounting aperture 151 (see FIG. 1) in the rounded corner of the first side wall 103. The aperture 151 is circular and extends through the thickness of the first side wall 103. The aperture 151 has a diameter slightly greater than that of the retaining pin 150 such that it forms a close-fit with the pin 150.

The pin 150 is slidable within the aperture 151, between first and second positions, to vary the extent that it extends across the front opening 106. In this respect, the pin 150 is slidable between a first position (see FIGS. 6 and 10), in which the pin 150 extends substantially across the front opening 106 and a second position (as shown in FIG. 1), in which it does not extend across the front opening 106.

In this respect, when the pin 150 is in the first position it extends from the inner face of the first side wall 103, across the front opening 106 and into in a blind bore 180 in the inner face of the second side wall 104 (as shown in FIG. 6). When the pin 150 is in the first position it extends across the front opening behind the front opening. In a further aspect of the invention it may extend across the front opening in front of the front opening. Alternatively, it may extend across the front opening at the front opening. When the pin 150 is in the first position it is oriented such that its longitudinal axis is substantially perpendicular to the planes of the first and second side walls 103, 104.

The locking device 101 also comprises a protective sleeve 153 (see FIG. 1) configured to substantially prevent access to the pin 150 through the front opening 106, when the pin 150 is in the first position (such access to the pin 150 is also prevented by the cover 109, as described above).

In this respect, the protective sleeve 153 is tubular and the general shape of a hollow cylinder. The protective sleeve 153 is mounted to the inner face of the cover 109, by a mounting bracket 154, and extends along the width of the cover 109.

The protective sleeve 153 is positioned and dimensioned such that when the cover 109 is in the closed position it is positioned so as to receive the pin 150, as the pin 150 is moved through the mounting aperture 151 from its second position to its first position. In this respect, as the pin 150 is slid through the aperture 151, a first end of the pin 150 is received in a first end of the protective sleeve 153 and as the pin 150 passes to its first position, it passes out of the second end of the protective sleeve 153 into engagement with the blind bore in the second side wall 104.

The length of the protective sleeve 153 is slightly less than the distance between the inner surfaces of the first and second side walls 103, 104 (i.e. slightly less than the width of the internal space 106) such that the protective sleeve 153 forms a close-fit with the first and second side walls, with the first and second ends of the sleeve 153 abutting the inner faces of the first and second side walls 103, 104.

In the described embodiment the sleeve 153 extends entirely around the pin 150 (around the circumference of the pin 150) and extends along substantially the length of the portion of the pin 150 between the side walls 103, 104. In this respect, the protective sleeve 153 substantially encloses the portion of the pin 150 extending between the inner surfaces of the first and second side walls 103, 104 of the housing. Both the cover 109 and sleeve 153 substantially prevent access to the pin 150 through the front opening 106 (when the cover is in its closed position), by forming a barrier to the pin 150. In this respect, the cover 109 and sleeve 153 cover the pin 150.

When the cover 109 is in its closed position and the pin 150 is in the first position, the pin 150 and protective sleeve 153 are located within the path of removal of the castor wheel 182' and mounting arms 185' from the housing such that they provide an obstruction that acts to prevent the removal of the castor wheel 182' (and the lower section of the mounting arms 185') from the housing 102 through the front opening 106. In this respect, the pin 150 and protective sleeve 153 are located in front of, and at the same height as, an upper portion of the castor wheel 182' and an upper section of the mounting arms 185. The pin 150 and protective sleeve extend across the width of the front opening 106 (i.e. between the inner surfaces of the side walls 103, 104).

The abutment 120 and protective sleeve 153 define a gap between them (G—see FIG. 6), in the depth direction (D'), that is small enough that the part of the ground engagement mechanism that is in the housing 102 cannot be removed from the housing 102 through the gap (G) and out through the upper opening 107. In this respect, the gap (G) is less than the diameter of the castor wheel 182'.

The abutment 120 and pin 150 also define a gap, in the depth direction (D'), between them that is small enough that part of the ground engagement mechanism that is in the housing 102 cannot be removed from the housing 102 through the gap and out through the upper opening 107.

The locking device 101 also comprises a lock housing 152 mounted to the outer face of the first side wall 103, at the rounded corner, and co-axial with the mounting aperture 151.

A lock 155 is mounted at an end of the pin 150. In the currently described embodiment the lock 155 is a cylinder lock, in the form of a barrel lock, operable by a key. However, it will be appreciated that any suitable type of lock may be used. The lock 155 is configured to selectively lock and unlock the pin 150 in its first position.

When the cylinder lock 155 is unlocked, the pin 150 is removable from the housing 102, by sliding it from its first position, all the way out of the mounting aperture 151, to a second position in which the pin 150 does not extend across the front opening 106. Accordingly, when the pin 150 is in the second position it does not prevent the removal of the (part of) the ground engagement mechanism 188' from the housing 102.

The lock 155 has a latch member 191 (see FIG. 7) that is selectively moveable between an extended position (shown in FIG. 7), in which it extends radially out of a cylindrical body of the lock 155, and a retracted position, in which it is fully received within the cylindrical body of the lock 155. The latch member 191 is movable between its extended and retracted position by inserting a key, that matches the lock, into the lock 155 and turning the key in first and second rotational directions.

In order to move the pin 150 from its second position to its first position, the latch member 191 is moved to its retracted position (by rotating the key) and the pin 150 is slid through the mounting aperture 151 across the front opening 106. When the pin 150 reaches its first position the lock 155 is received in the lock housing 152 and latch member 191 is aligned with a bore in an internal surface of the lock housing 152. The key is then turned to move the latch member 191 to its extended position, which causes the latch member 191 to enter into bore. This acts to lock the pin 150 in its first position. In order to unlock the pin 150 and move it to its second position, the key is inserted into the lock 152 and turned (in the opposite direction) to actuate the latch member 191 to its retracted position (i.e. out of the internal bore in the lock housing 152). The pin 150 can then be removed to its second position.

When the pin 150 is in the first position it retains the cover 109 in its closed position, due to the attachment of the sleeve 153 to the cover 109. This therefore acts to retain the (part of) the ground engagement mechanism 188' in the housing 102. In addition, as stated above, the pin 150 provides an obstacle in the path of the ground engagement member 188' that prevents the ground engagement member 188' being removed from the housing 102 through the front opening 106. Accordingly the pin 150 and cover 109 (and protective sleeve 153) form a retaining mechanism that acts to prevent the removal of the (part of) the ground engagement mechanism 188' from the housing 102, through the front opening 106.

Furthermore because the cover 109 closes the front opening 106 it also substantially prevents access to the pin 150 through the front opening 106. In this respect, the cover 109 also acts as a retaining member (pin 150) protector (in addition to the sleeve 153).

When the pin 150 is in the second position, the cover 109 is movable to its open position in which the (part of the) ground engagement mechanism 188' is removable from the housing 102 through the front opening 106. In this respect, when the retaining pin 150 is in the second position, the retaining mechanism (comprising the cover 109 and the retaining pin 150) is movable to a releasing configuration (by moving the cover to its open position) which allows the (part of the) ground engagement mechanism 188' to be removed from the housing 102, through the front opening 106.

As stated above, when the retaining mechanism is in the retaining configuration (i.e. when the pin 150 is in the first position), both the protective sleeve 153 and the cover 109 act to substantially prevent access to the pin 150 through the front opening 106. This advantageously provides a secure locking device, as it makes it difficult, or impossible, for the pin 150 to be accessed and tampered with.

Furthermore, because the pin 150 acts to both lock the cover 109 in its closed position and to provide an obstacle that prevents the (part of the) ground engagement mechanism 188' from being removed from the housing 102, through the front opening 106, the prevention of access to the pin 150 therefore provides a highly secure arrangement that prevents the ground engagement mechanism 188 being removed from the housing 102.

In addition, this dual function of the pin 150 allows the locking device 101 to be relatively compact and easy to use as locking the pin 150 (in its first position) both locks the cover 109 in its closed position and acts to retain the (part of the) ground engagement mechanism 188' in the housing 102 (by providing an obstacle to the removal of the ground engagement mechanism 188' through the front opening 106).

Furthermore, because the protective sleeve 153 is mounted to the cover 109, when the cover 109 is in its open position (detached from the housing 102) the protective sleeve 153 does not present an obstacle to the removal of the ground engagement member from the housing 102. This also provides for a compact and easy to use arrangement.

Figure 11:
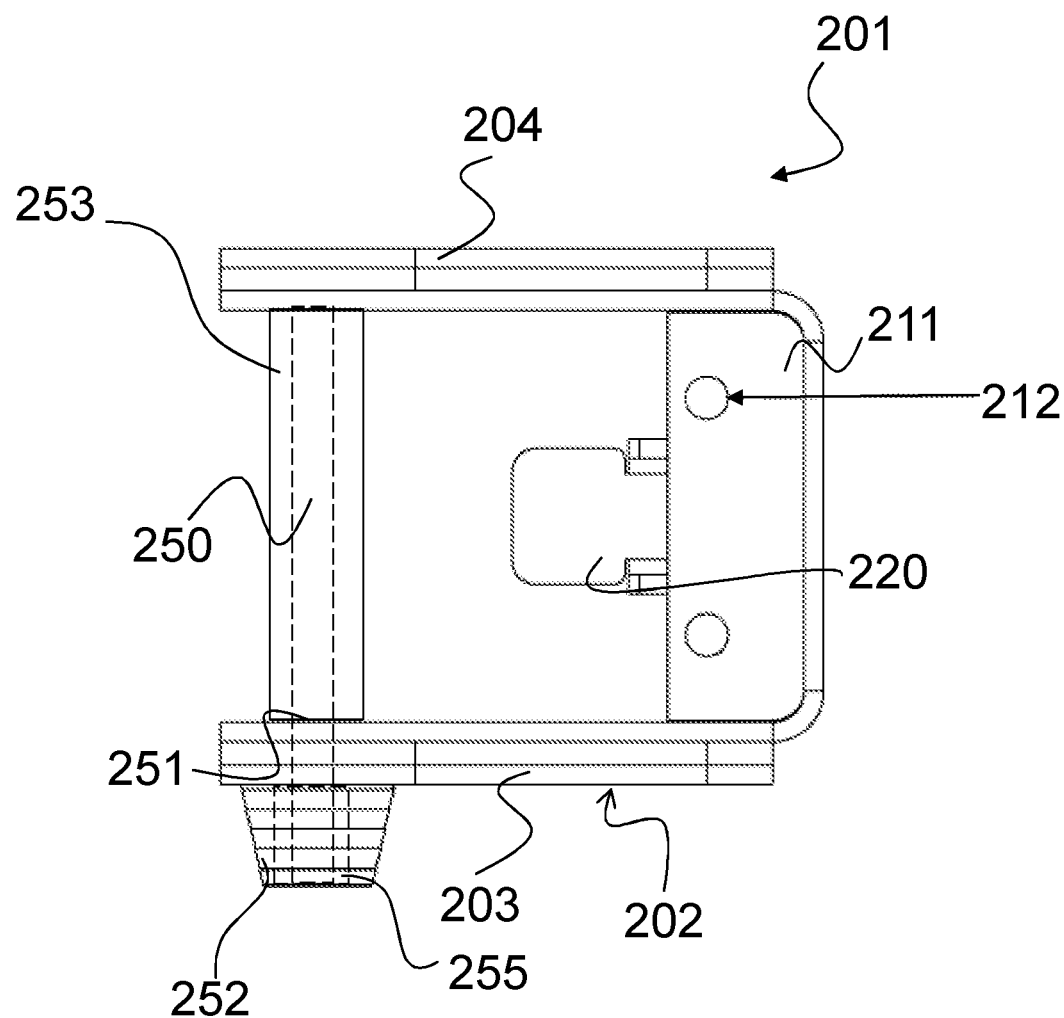
FIG. 11 shows a view from below of a locking device according to a second embodiment of the invention, where a retaining pin of the locking device is shown in a first position.

Referring to FIG. 11 there is shown a locking device 201 according to a second embodiment of the invention. The locking device 201 of the second embodiment is identical to the locking device 101 of the first embodiment, except for the differences described below. Corresponding features are given corresponding reference numerals but incremented by 100.

The locking device 201 of the second embodiment is identical to the locking device 101 of the first embodiment, except in that the cover 109 is omitted. In addition, the protective sleeve 253 is freely mounted on the retaining pin 250. In this respect, as the retaining pin 250 is inserted in the mounting bore 251 and moved to its first position, the protective sleeve 253 is positioned over the mounting bore 251 such that is aligned with the mounting bore 251 and receives the pin 250. When the pin 250 is in its first position the sleeve 253 is mounted in position on the pin 250. As the pin 250 is slid back through the mounting bore 251, out of the housing 202, to its second position, the sleeve 250 is slid off the pin 250 and then removed from the housing 202.

Figure 12:
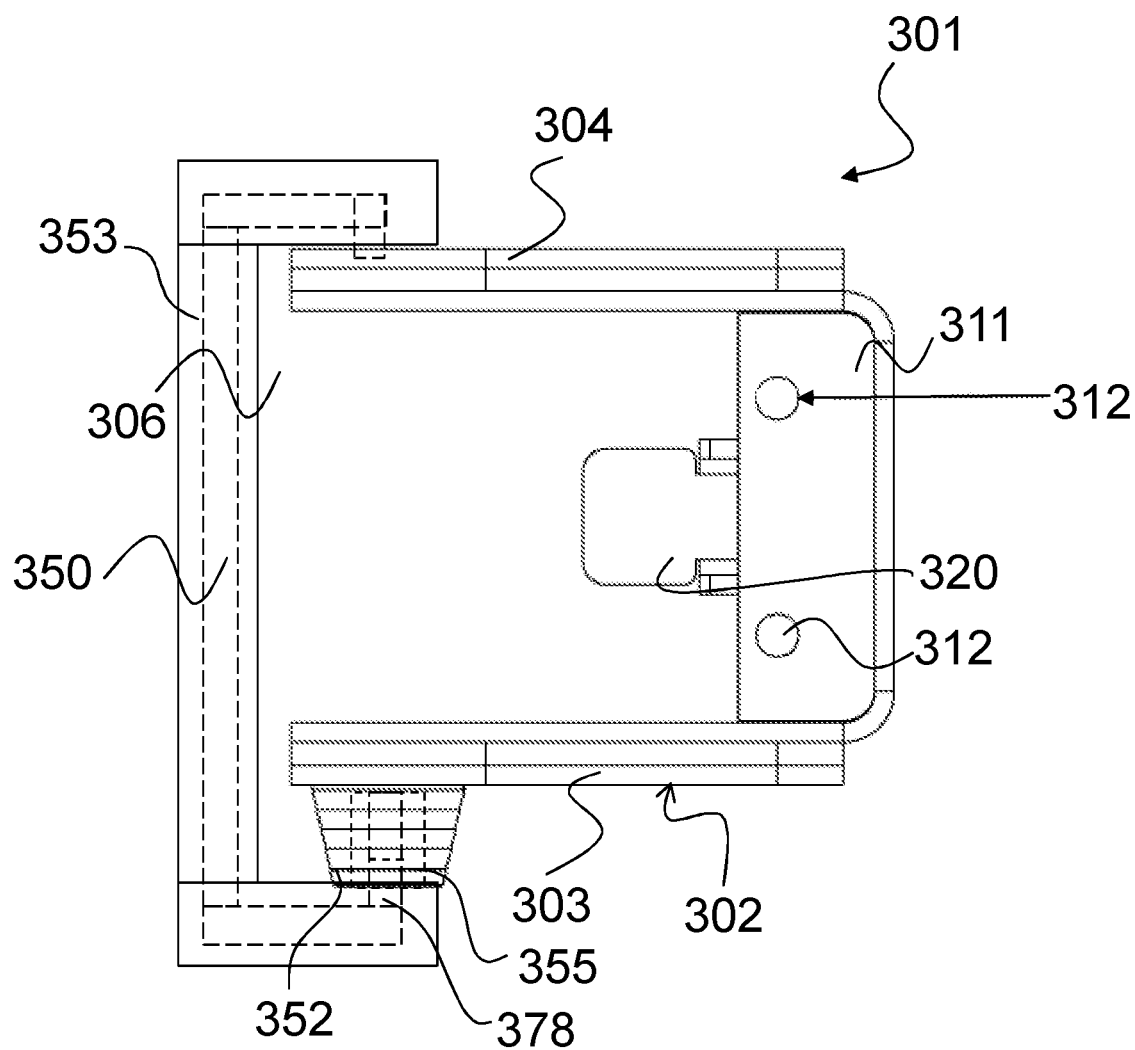
FIG. 12 shows a view from below of a locking device according to a third embodiment of the invention, where a retaining pin of the locking device is shown in a first position.
Figure 13:
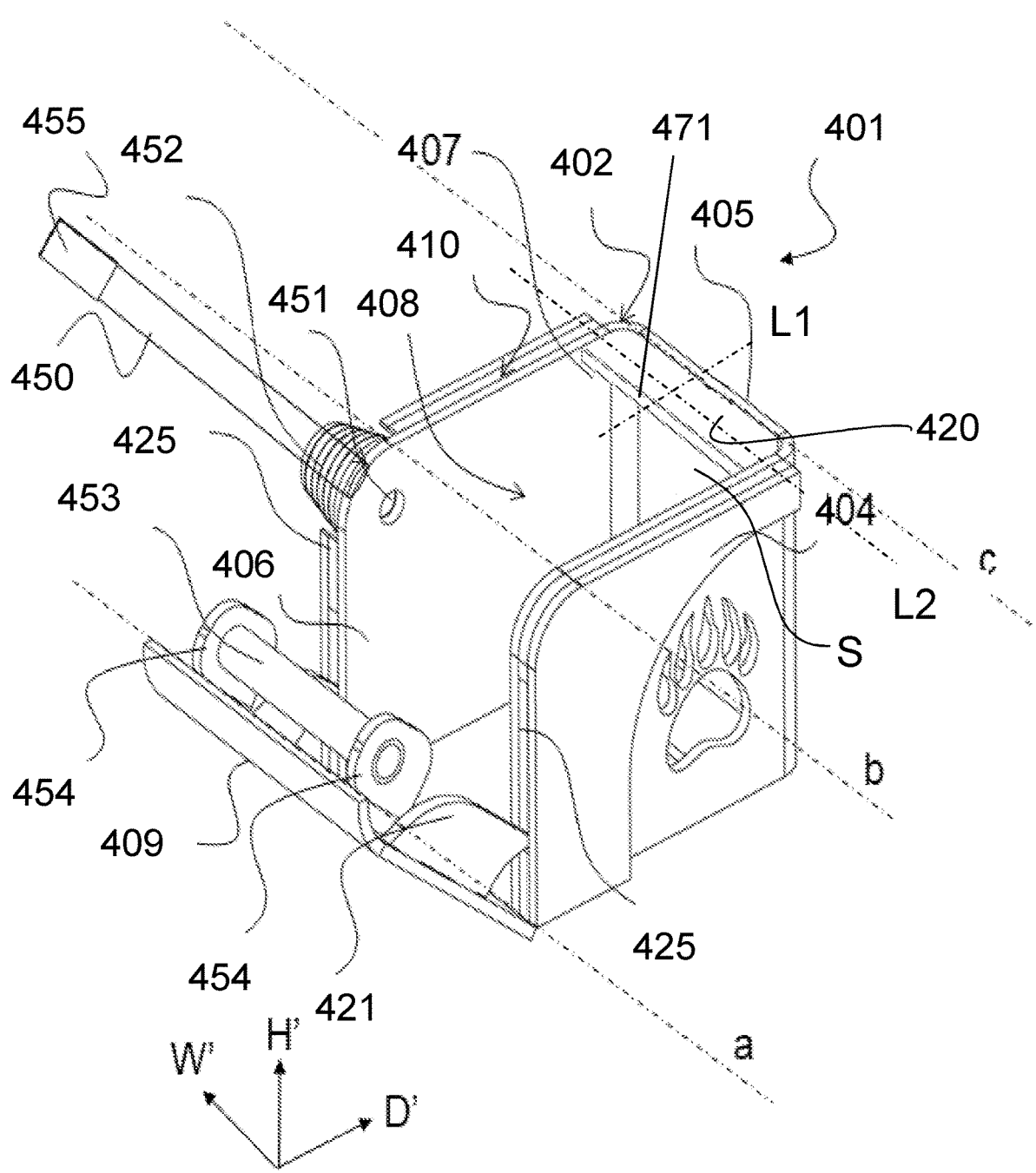
FIG. 13 shows a view corresponding to that of FIG. 1 but where the locking device is a locking device according to a fourth embodiment of the invention.
Figure 14:
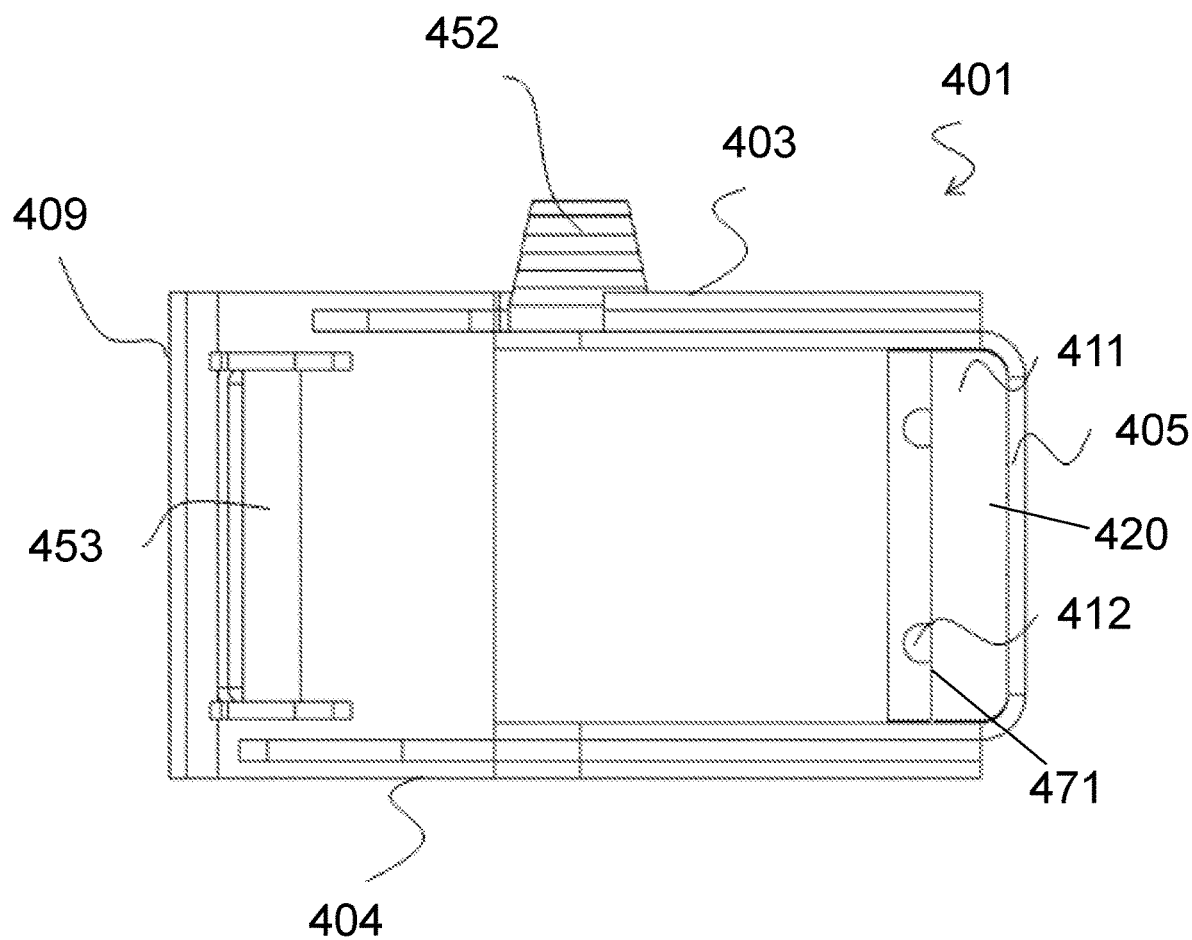
FIG. 14 shows a view corresponding to that of FIG. 3 but where the locking device is a locking device according to a fourth embodiment of the invention.
Figure 15:
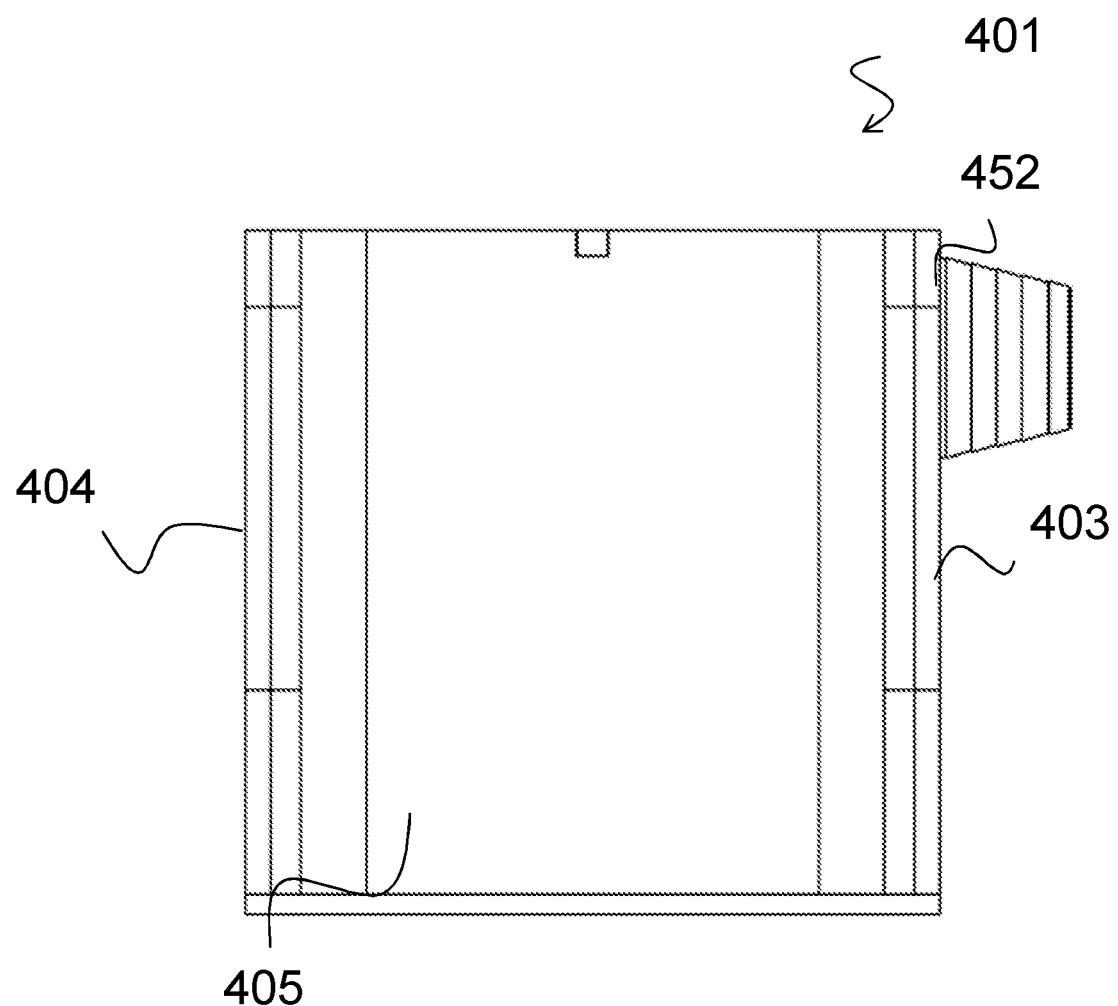
FIG. 15 shows a view corresponding to that of FIG. 4 but where the locking device is a locking device according to a fourth embodiment of the invention.
Figure 16:
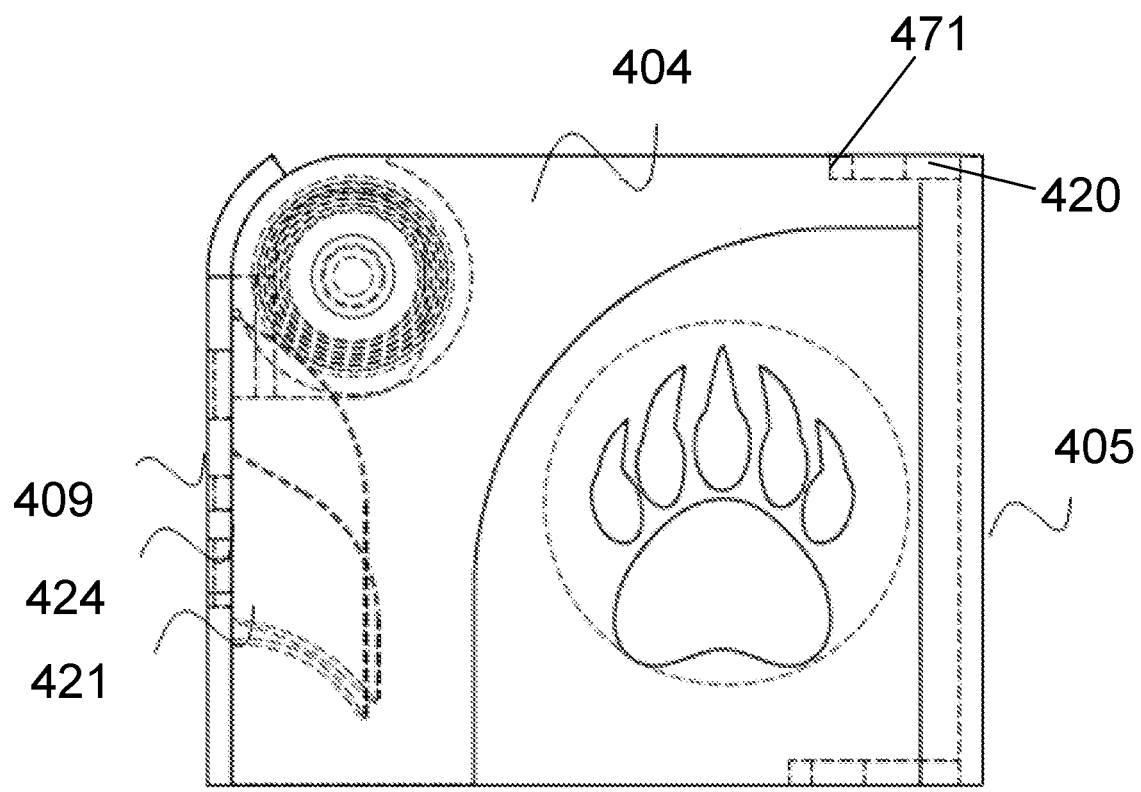
FIG. 16 shows a view corresponding to that of FIG. 5 but where the locking device is a locking device according to a fourth embodiment of the invention.
Figure 17:
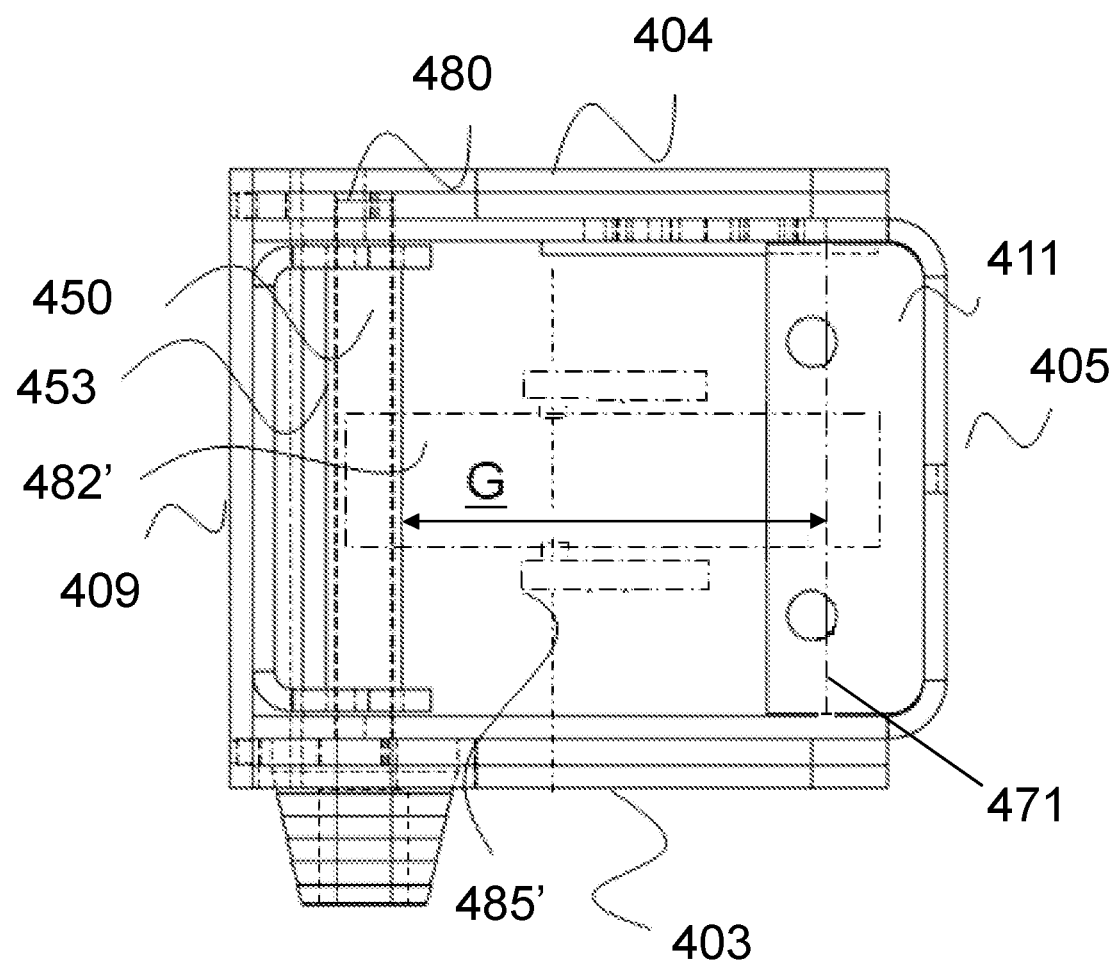
FIG. 17 shows a view corresponding to that of FIG. 6 but where the locking device is a locking device according to a fourth embodiment of the invention.
Figure 18:
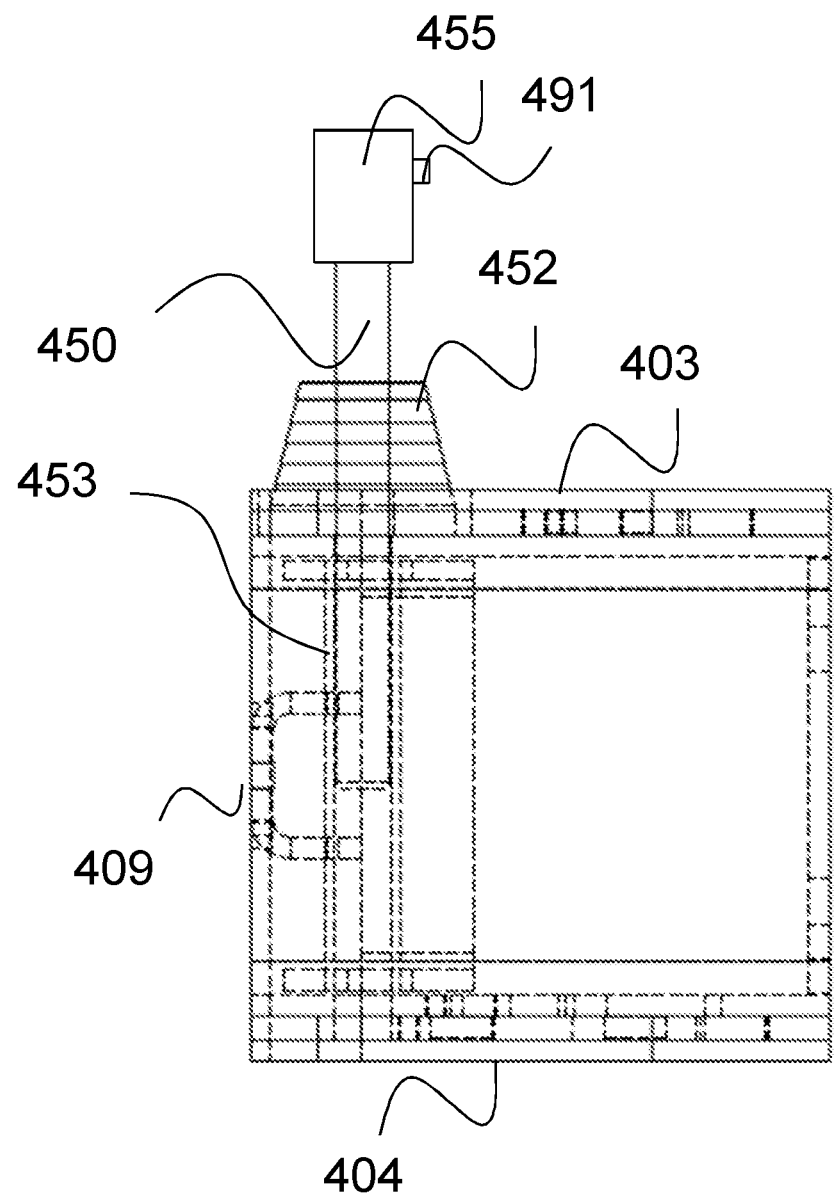
FIG. 18 shows a view corresponding to that of FIG. 7 but where the locking device is a locking device according to a fourth embodiment of the invention.
Figure 19:
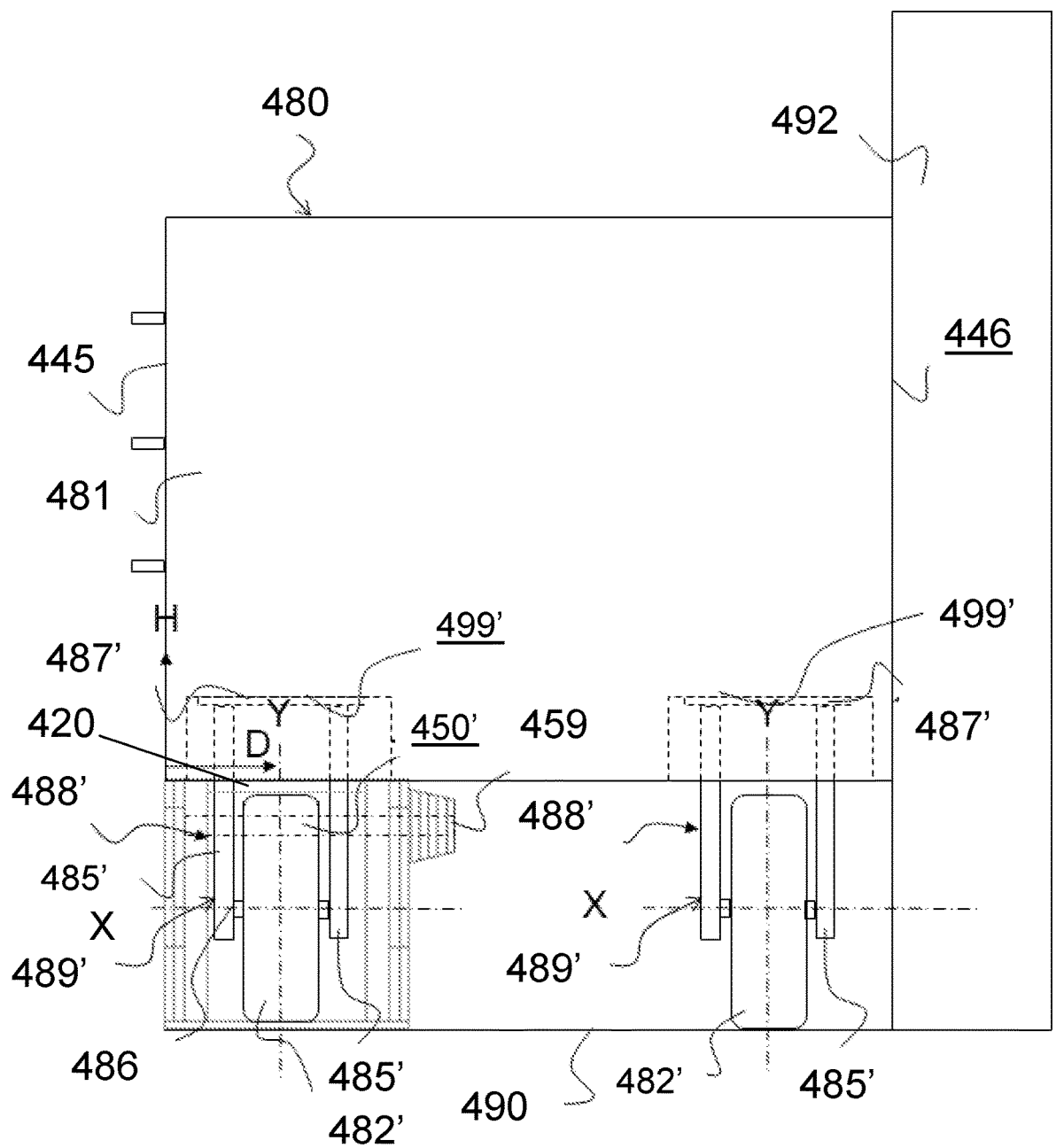
FIG. 19 shows a view corresponding to that of FIG. 10 but where the locking device is a locking device according to a fourth embodiment of the invention.

Referring to FIG. 12 there is shown a locking device 301 according to a third embodiment of the invention. The locking device 301 of the third embodiment is identical to the locking device 101 of the first embodiment, except for the differences described below. Corresponding features are given corresponding reference numerals but incremented by 200.

The locking device 301 of the third embodiment is identical to the locking device 101 of the first embodiment, except in that the cover 109 is omitted. In addition, the retaining pin 350 has a general horseshoe shape and is mounted on the exterior of the housing 302. When the retaining pin 350 is in its first position it extends across the front opening 306, in front of the front opening 306, to prevent the part of the ground engagement mechanism 188' being removed from the housing 302. In this respect, when the pin 350 is in its first position a first end of the pin is mounted in a blind bore in the exterior surface of the second side wall 304 of the housing 302 and a second end of the pin 350, with its lock 355, is mounted in the lock housing 352 to lock the pin 350 in its first position. The pin 350 has a telescopic section 378, that is extendible and retractable, to allow the pin 350 be mounted to and removed from the external of the housing 302, i.e. to move it between its first and second positions. When the pin 350 is locked in its first position the telescopic section 378 is locked in its retracted position. This may be achieved via any conventional mechanical coupling to the lock 355. When the retaining pin 350 is in its first position it is located at the same height, across the front opening 306, as in the first embodiment. The protective sleeve 353 is permanently mounted on the sections of the pin 350 that are external to the housing 302 when the pin 350 is in its first position.

Referring to FIGS. 13 to 19 there is shown a locking device 401 according to a fourth embodiment of the invention. The locking device 401 of the fourth embodiment is identical to the locking device 101 of the first embodiment, except for the differences described below. Corresponding features are given corresponding reference numerals but incremented by 300.

The locking device 401 of the third embodiment is identical to the locking device 101 of the first embodiment, except in that the upper abutment 420 is a thin plate that extends between the first and second side walls 403, 404.

As with the first embodiment, the abutment 420 is configured to allow at least part of the ground engagement mechanism 188' to be received in the housing 402 through the opening 406 but to prevent the at least part of the ground engagement mechanism 188' from being removed through the upper opening 407.

In this respect, the abutment 420 is located at a rear of the housing 402. The abutment 420 extends forwardly from a top section of the forward face of the rear wall 405 of the housing 402, along a longitudinal axis L1 that is substantially perpendicular to the rear wall 405. In this respect, the rear wall 405 generally extends in a plane, with the abutment 420 extending forwardly from the rear wall 405 along a longitudinal axis L1 that is substantially perpendicular to the plane of the rear wall 405.

The abutment 420 extends along the front face of the rear wall 405, from the first side wall 403 to the second side wall 404, along a lateral axis L2 that is substantially perpendicular to the first and second side walls 403, 404. In this respect, the first and second side walls 403, 404 each generally extend in a plane, with the planes of the first and second side walls 403, 404 being substantially parallel to each other. The abutment 420 extends from the first side wall 403 to the second side wall 404 along a lateral axis L2 that is substantially perpendicular to the planes of the first and second side walls 403, 404. In this respect the abutment 420 is planar and is contained in a plane that is substantially perpendicular to the first and second side walls 403, 404.

The abutment 420 has a front face 471 that is substantially flat and substantially contained in a plane that is perpendicular to the first and second side walls 403, 404 (i.e. to the planes of the first and second side walls). However it will be appreciated that the abutment is not limited to this shape and may have a variety of suitable shapes. For example, the front face 471 may have a middle section that is substantially flat and substantially contained in a plane that is perpendicular to the first and second side walls 403, 404 and first and second end regions that extend forwardly from the middle section to the first and second side walls 403, 404 respectively. The first and second end regions may be curved (when viewed in plane that is perpendicular to the first and second side walls). Alternatively the first and second end regions may be straight (when viewed in plane that is perpendicular to the first and second side walls).

A space S is provided beneath the abutment 420, for receiving a part of the wheel 482' of the ground engagement mechanism 488'. In this respect, the space S is provided between the abutment 420 and the lower (open) side of the housing 402. The upper surface of the abutment 420 is substantially flush with the mounting side 410 of the housing 402. When the (part of) the ground engagement mechanism 488' is received in the housing 402, a rear portion of the wheel 482' is received underneath the abutment 420, in the space S.

The abutment 420 and protective sleeve 453 define a gap (G) between them (see FIG. 17), in the depth direction (D'), that is small enough that the wheel 482' cannot be removed from the housing 402 through the gap (G) and out through the upper opening 407. In this respect, the gap (G) is less than the diameter of the wheel 482'. It will be appreciated that the gap (G) is provided between the front face 471 of the abutment 420 (see FIG. 17) and the protective sleeve 453.

The abutment 420 and pin 450 also define a gap, in the depth direction (D'), between them that is small enough that the wheel 482' cannot be removed from the housing 402 through the gap and out through the upper opening 407.

Because the abutment 420 extends between the first and second side walls 403, 404 (i.e. from one of the side walls 403, 404 to the other) this may advantageously allow the abutment 420 to be relatively short (in the longitudinal direction L1) and yet still prevent the wheel 482' being removed through the upper opening 407. In this respect because the abutment 420 extends between the first and second side walls 403, 404 it may prevent the wheel 482' from being rotated diagonally (such that it extends across a diagonal of the housing 402, which may be the largest dimension of the housing 402) so as to try and pass the wheel 482' through the upper opening 407, whilst still being relatively short in the longitudinal direction (L1) (i.e. in the fore-aft direction of the housing). This may prevent, or reduce, the abutment 420 rubbing against the wheel 482' as the wheel 482' is inserted into, and removed from, the housing 402.

Figure 20:
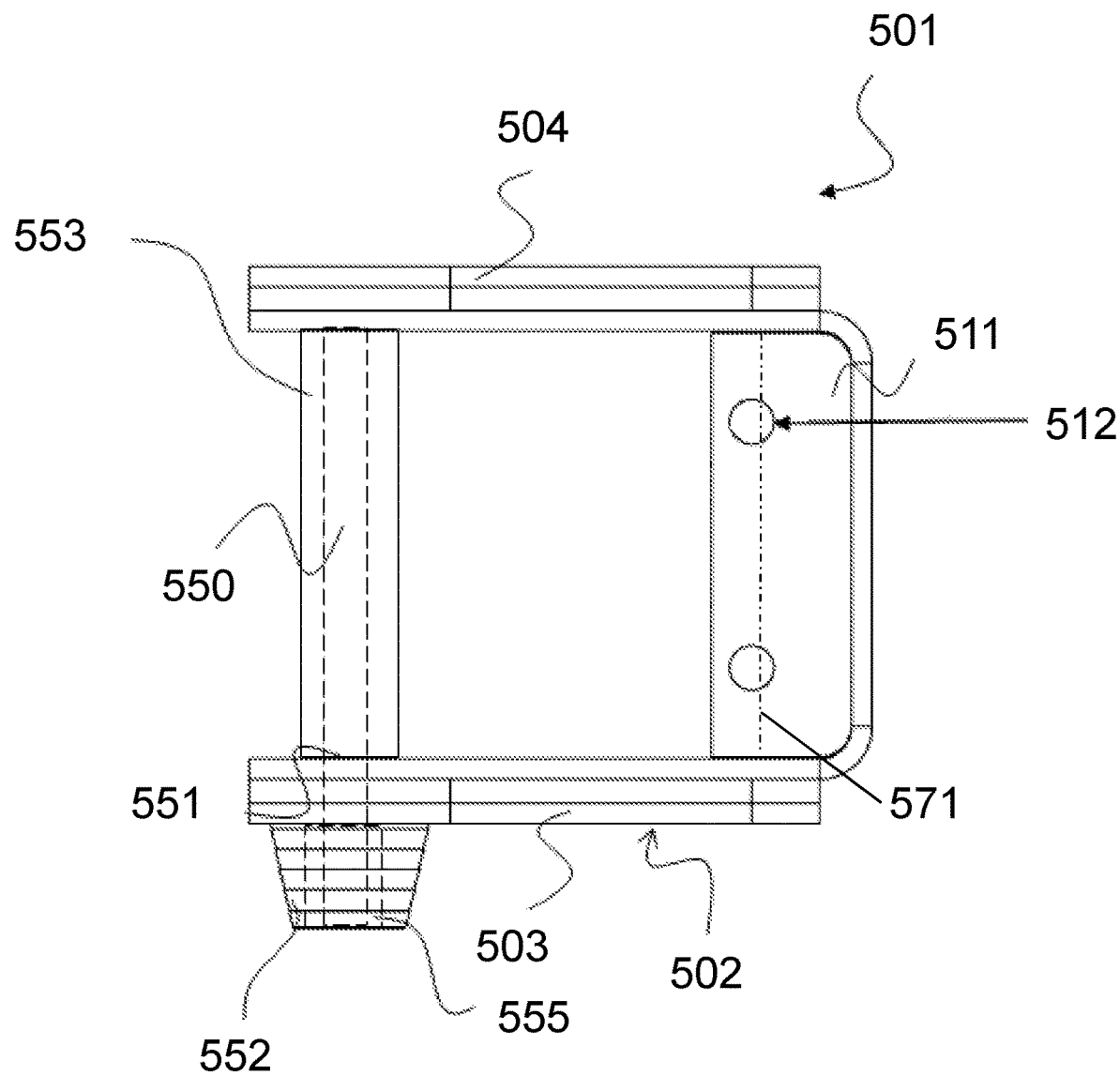
FIG. 20 shows a view corresponding to that of FIG. 11 but where the locking device is a locking device according to a fifth embodiment of the invention.

FIG. 20 shows a view corresponding to that of FIG. 11 but where the locking device is a locking device 501 according to a fifth embodiment of the invention.

The locking device 501 of the fifth embodiment is identical to the locking device 201 of the second embodiment, except for the differences described below. Corresponding features are given corresponding reference numerals but incremented by 300 (relative to those used for the second embodiment).

The locking device 501 of the fifth embodiment is identical to the locking device 201 of the second embodiment, except in that its abutment is the abutment 420 of the fourth embodiment of the invention.

Figure 21:
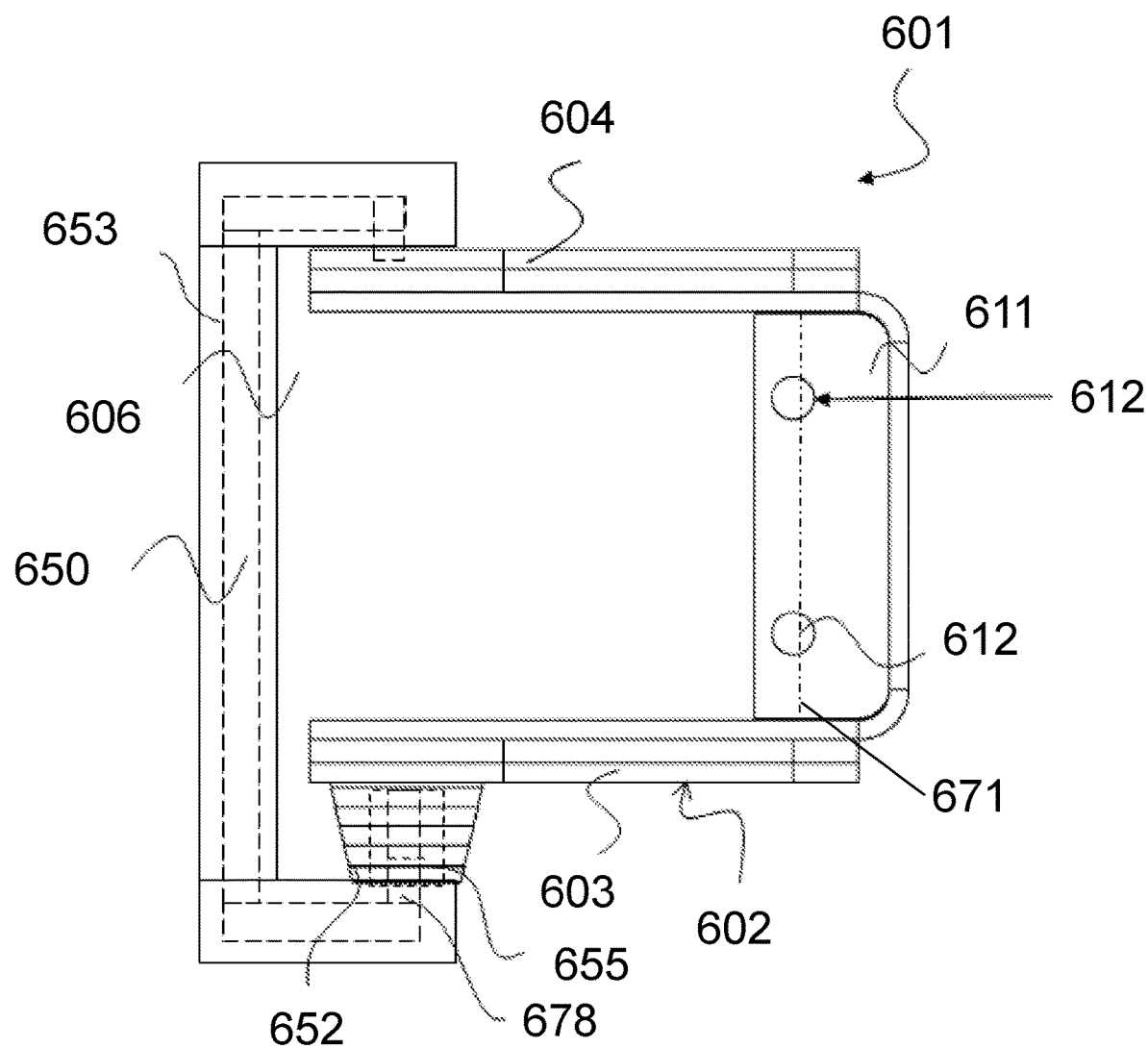
FIG. 21 shows a view corresponding to that of FIG. 12 but where the locking device is a locking device according to a sixth embodiment of the invention.

FIG. 21 shows a view corresponding to that of FIG. 12 but where the locking device is a locking device 601 according to a sixth embodiment of the invention.

The locking device 601 of the sixth embodiment is identical to the locking device 301 of the third embodiment, except for the differences described below. Corresponding features are given corresponding reference numerals but incremented by 300 (relative to those used for the third embodiment).

The locking device 601 of the sixth embodiment is identical to the locking device 301 of the third embodiment, except in that its abutment is the abutment 420 of the fourth embodiment of the invention.

In the above described embodiments the locking device 101, 201, 301, 401, 501, 601 is used to secure a 'front' ground engagement mechanism 188' to the floor 190, i.e. a ground engagement mechanism 188' that is proximal the front side 145 of the toolbox body 181. This provides for ease of access. Furthermore, the locking device 101, 201, 301 is oriented such that the lock 155 is located on a 'rear' side of the ground engagement mechanism, i.e. facing rearwardly, underneath the toolbox body 181. In this respect, the keyhole 159 of the lock 155 faces rearwardly. This acts to prevent tampering with the lock 155 as it makes it less accessible to tools.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

For example, in the first embodiment, when the pin 150 is in its first position it acts to both lock the cover 109 in its closed position and to provide an obstacle that prevents the (part of the) ground engagement mechanism 188' from being removed from the housing 102, through the front opening 106. Alternatively, when the pin 150 is in its first position, it may only provide one of these functions. For example, when the pin 150 is in its first position it may lock the cover 109 in its closed position, but it may be positioned in the housing 106 such that it does not provide an obstacle that prevents the part of the ground engagement mechanism 188' from being removed from the housing 102, through the front opening 106. As a further example, when the pin 150 is in its first position it may provide an obstacle that prevents the part of the ground engagement mechanism 188' from being removed from the housing 102, through the front opening 106 but it might not lock the cover 109 in its closed position. In this case, the locking device 101 may have a separate locking mechanism configured to selective lock the cover 109 in its closed position.

It will be appreciated that the lock protector 153 and pin 150 may be of any cross-sectional shape and do not have to have a circular cross-sectional shape.

In the first embodiment, when the cover 109 is in its closed position it substantially closes the front opening 106. Alternatively it may only partially cover the front opening 106. In this case, the cover 109 may cover the opening 106 sufficiently that it prevents the removal of the (part of the) ground engagement mechanism 188' through the front opening 106.

In the first embodiment the cover 109 is detachable from the housing 102. This is advantageous in that it may allow the ground engagement mechanism 188' to be rolled in the housing 102. Alternatively the cover 109 may not be detachable from the housing 102. For example the cover 109 may be pivotally attached to the housing 102 by a hinged arrangement such that it is movable relative to the housing 102 between an open position in which it allows the removal of the castor 182 through the front opening 106 and a closed position in which it closes the front opening 106 such that the castor 182 is prevented from being removed through the front opening 106.

The upper abutment 120 may be omitted where the retaining pin 150 or protective sleeve 153 (when the pin is in its first position) forms a gap with a part of the housing, for example the rear wall of the housing, that is small enough that it prevents the removal of the (part of the) ground engagement mechanism 188' through the gap and out of the upper opening 107.

In the first and second embodiments when the pin 150, 250 is in its first position, the pin and sleeve provide an obstruction that prevents the removal of the part of the ground engagement member 188' through the front opening 106, 206 in the housing 102, 202 and through the upper opening 107, 207. Alternatively it may be positioned that it only prevents the removal of the (part of the) ground engagement mechanism 188' through one of these openings.

In the described embodiments the lower face of the housing 102, 202, 302, 402, 502, 602 is open. Alternatively, the lower face may be closed.

In the described embodiments the housing 102, 202, 302, 402, 502, 602 has the general shape of a cuboid with an open front, top and bottom face. However, it will be appreciated that the housing may have any suitable shape.

In the described embodiments the ground engagement member 182, 182' is a wheel in the form of a castor wheel 182. However the ground engagement member may be any type of rollable member, including a wheel, roller, ball, etc.

In the described embodiments the lock 155, 255, 355, 455, 555, 655 is a cylinder lock. However it will be appreciated that any suitable type of lock may be used.

In the described embodiments the retaining member protector is configured to substantially prevent access to substantially the entire retaining pin when the pin is in the first position. Alternatively, the retaining member protector may be configured to only prevent access to part of the pin. In this respect, the retaining member protector might only extend part way along the length and/or only part way around perimeter of the retaining member.

In the described embodiments the retaining member protector comprises the sleeve and/or cover. However, any suitable type of protector, that substantially prevents access to at least part of the retaining member, when the retaining member is in the first configuration, may be used. For example one or more shielding parts may be provided between the pin and the front opening or at the front opening, to substantially prevent access to at least part of the pin through the front opening.

The protective sleeve and/or cover may substantially prevent access to the at least part of the pin by preventing access through the front opening. Alternatively the protective sleeve and/or cover may allow access through the front opening but prevent this access through the front opening from accessing the at least part of the pin.

In some of the described embodiments both the cover and protective sleeve act to prevent access to the pin. Alternatively, the locking device may be configured such that only one of the cover or the protective sleeve prevents access to the pin (i.e. substantially prevent access to at least a part of the pin), when the pin is in the first position. For example one of the cover and the protective sleeve may be omitted. It will be appreciated that if the protective sleeve is omitted then a separate locking mechanism may be used to lock the cover in the closed position.

In the described embodiments the housing is securable to the support structure by a securing plate. It will be appreciated that locking device may comprise any suitable type of securing member for use in securing (either alone or in combination with one or more complimentary securing members, e.g. fasteners such as screws or bolts, or a complimentary member secured to the support structure, that is engageable with the securing member) the housing with respect to a support structure (e.g. a floor, wall, etc.). The locking device may not have a dedicated securing member, for example it could be secured to a support structure by a chain, rope, etc, that wraps around the locking device.

In the described embodiments the housing is for receiving a part of a ground engagement mechanism 188, 188' of the toolbox 180. However, it will be appreciated that the housing may be for receiving an entire ground engagement mechanism 188, 188' of the toolbox 180.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments. Where 'or' is used in the foregoing description, this it to be taken to mean 'and/or'.

The invention claimed is:

1. A locking device for securing a toolbox with respect to a support structure, the locking device comprising:
    a housing for receiving at least part of a ground engagement mechanism of a toolbox;
    the housing being securable to a support structure;
    the housing being configurable to have an opening, or having an opening, through which at least part of a ground engagement mechanism of a toolbox may be inserted into and removed from the housing;
    the locking device comprising:
        (a) a retaining mechanism that is movable between a retaining configuration, that prevents the removal of the at least part of the ground engagement mechanism from the housing through the opening, and
        (b) a releasing configuration that allows the removal of the at least part of the ground engagement mechanism from the housing through the opening;
    wherein the retaining mechanism comprises a retaining member that is movable between a first position such that the retaining mechanism is in the retaining configuration and a second position such that the retaining mechanism is movable to, or is in, the releasing configuration;
    wherein the locking device comprises a lock configured such that the retaining member is selectively lockable in its first position;
    wherein the locking device comprises a retaining member protector configured to substantially prevent access to at least part of the retaining member through the opening, when the retaining member is in the first position;
    wherein the retaining mechanism comprises a cover that is movable relative to the opening, between an open position and a closed position, to vary the amount that it covers the opening;
    wherein the cover is selectively attachable and detachable from the housing such that when the cover is in its closed position it is attached to the housing and when it is in its open position it is detached from the housing; and
    wherein one of the cover or housing comprises a male member and the other comprises a female member, the male and female members being selectively engageable and disengageable with each other to selectively attach and detach the cover to the housing.

2. The locking device according to claim 1, wherein when the cover is in its open position it is positioned relative to the opening such that the at least part of the ground engagement mechanism can be inserted into and removed from the housing through the opening and when the cover is in its closed position it covers the opening to an extent that prevents the removal of the at least part of the ground engagement mechanism from the housing through the opening and wherein when the retaining member is in its first position it retains the cover in its closed position.

3. The locking device according to claim 1, wherein when the cover is in its closed position it forms the, or part of the, retaining member protector.

4. The locking device according to claim 1, wherein the housing comprises a mounting side, for mounting the toolbox thereon, such that the at least part of the ground engagement mechanism of the toolbox is received in the housing and wherein the locking device is configured such that as the cover is moved to its closed position, it does not extend past the mounting side of the housing.

5. The locking device according to claim 1, wherein the housing comprises a mounting side, for mounting the toolbox thereon, such that the at least part of the ground engagement mechanism of the toolbox is received in the housing, and wherein the locking device comprises an abutment configured to allow the at least part of the ground engagement mechanism to be received in the housing through the opening but to prevent the at least part of the ground engagement mechanism from being removed through an opening in the mounting side.

6. The locking device according to claim 1, wherein the housing comprises opposed first and second side walls that are spaced apart to provide said opening, between the side walls, and wherein an abutment extends between the first and second side walls.

7. The locking device according to claim 1, wherein the retaining member protector comprises a protective sleeve that receives at least part of the retaining member when it is in its first position to substantially prevent access to the at least part of the retaining member through the opening.

8. The locking device according to claim 1, wherein the locking device is configured such that when the retaining member is in its first position it prevents the removal of the at least part of the ground engagement mechanism from the housing through the opening by obstructing a part of the toolbox.

9. The locking device according to claim 1, wherein the locking device is configured such that when the retaining member is in its second position, the retaining member protector is movable to, or is in, a position that allows the removal of the at least part of the ground engagement mechanism from the housing through the opening.

10. The locking device according to claim 9, wherein the retaining member protector is coupled to the cover such that when the cover is in its open position, the retaining member protector is in a position that allows the removal of the at least part of the ground engagement mechanism from the housing through the opening.

11. A toolbox assembly comprising a toolbox and the locking device according to claim 1, wherein at least part of a ground engagement mechanism of the toolbox is retained in the housing of the locking device to secure the toolbox with respect to a support structure.

12. A kit of parts comprising:
    a toolbox having a ground engagement mechanism; and
    the locking device according claim 1, wherein the housing of the toolbox is for receiving at least part of the ground engagement mechanism of the toolbox and when the retaining mechanism is in its retaining configuration it prevents the removal of the at least part of the ground engagement mechanism from the housing.

13. A method of securing a toolbox with respect to a support structure, the method comprising:
- securing the locking device according to claim 1 to a support structure;
- receiving at least part of a ground engagement mechanism of a toolbox in a housing of the locking device, through an opening in the housing;
- placing a retaining mechanism of the locking device in a retaining configuration, that prevents the removal of the at least part of the ground engagement mechanism from the housing through the opening, by moving a retaining member of the retaining mechanism to a first position;
- and locking the retaining member in the first position;
- and wherein the locking device comprises a retaining member protector that substantially prevents access to at least part of the retaining member through the opening, when the retaining member is in the first position.

14. A locking device for securing a toolbox with respect to a support structure, the locking device comprising:
- a housing for receiving at least part of a ground engagement mechanism of a toolbox;
- the housing being securable to a support structure;
- the housing being configurable to have an opening, or having an opening, through which at least part of a ground engagement mechanism of a toolbox may be inserted into and removed from the housing;
- the locking device comprising a retaining mechanism that is movable between a retaining configuration, that prevents the removal of the at least part of the ground engagement mechanism from the housing through the opening, and a releasing configuration that allows the removal of the at least part of the ground engagement mechanism from the housing through the opening;
- wherein the retaining mechanism comprises a retaining member that is movable between a first position such that the retaining mechanism is in the retaining configuration and a second position such that the retaining mechanism is movable to, or is in, the releasing configuration;
- wherein the locking device comprises a lock configured such that the retaining member is selectively lockable in its first position; and
- wherein the locking device comprises a retaining member protector comprising a protective sleeve that receives at least part of the retaining member when it is in its first position to substantially prevent access to the at least part of the retaining member;
- wherein the retaining mechanism comprises a cover that is movable relative to the opening, between an open position and a closed position, to vary the amount that it covers the opening;
- wherein the cover is selectively attachable and detachable from the housing such that when the cover is in its closed position it is attached to the housing and when it is in its open position it is detached from the housing; and
- wherein one of the cover or housing comprises a male member and the other comprises a female member, the male and female members being selectively engageable and disengageable with each other to selectively attach and detach the cover to the housing.

15. A locking device according to claim 14 wherein the locking device is configured such that when the retaining member is in its first position it prevents the removal of the at least part of the ground engagement mechanism from the housing through the opening by obstructing a part of the toolbox.

* * * * *